US006497779B1

(12) United States Patent
Suzuki et al.

(10) Patent No.: US 6,497,779 B1
(45) Date of Patent: Dec. 24, 2002

(54) HYDRAULIC TRANSFER METHOD AND DEVICE AND HYDRAULIC-TRANSFER ARTICLE

(75) Inventors: Eiji Suzuki, Fuji (JP); Makoto Suzuki, Fuji (JP); Nobuyuki Otaki, Shimizu (JP); Tomomi Kiyotaki, Shizuoka (JP)

(73) Assignee: Cubic Co., Ltd., Shizuoka-Ken (JP)

( * ) Notice: Subject to any disclaimer, the term of this patent is extended or adjusted under 35 U.S.C. 154(b) by 0 days.

(21) Appl. No.: 09/509,248

(22) PCT Filed: Jul. 22, 1999

(86) PCT No.: PCT/JP99/03910

§ 371 (c)(1),
(2), (4) Date: Mar. 23, 2000

(87) PCT Pub. No.: WO00/05082

PCT Pub. Date: Feb. 3, 2000

(30) Foreign Application Priority Data

Jul. 23, 1998 (JP) ........................................... 10-207607

(51) Int. Cl.[7] ......................... B44C 1/165; B32B 31/00; B05C 3/00; B41M 3/12

(52) U.S. Cl. ....................... 156/230; 156/240; 156/277; 156/384; 427/149; 118/402

(58) Field of Search ................................ 156/230, 240, 156/350, 378, 236, 244.27, 155, 277, 384; 427/149, 434.3; 118/402

(56) References Cited

U.S. PATENT DOCUMENTS

| | | | | |
|---|---|---|---|---|
| 4,436,571 A | | 3/1984 | Nakanishi | 156/384 |
| 5,916,400 A | * | 6/1999 | Zaher | 156/230 |

FOREIGN PATENT DOCUMENTS

| | | | |
|---|---|---|---|
| JP | 59-7072 | | 1/1984 |
| JP | 1-208198 | | 8/1989 |
| JP | 2-132000 | | 5/1990 |
| JP | 4-122673 | | 4/1992 |
| JP | 7-32796 | | 2/1995 |
| JP | 4-925498 | * | 9/1997 |
| JP | 10-297194 | | 11/1998 |
| JP | 02001-277790 | * | 10/2001 |

OTHER PUBLICATIONS

English Translation for the Abstract of JP02001–277790.*

* cited by examiner

*Primary Examiner*—Jerry Lorengo
*Assistant Examiner*—Yewebdar T. Tadesse
(74) *Attorney, Agent, or Firm*—Pearne & Gordon LLP

(57) ABSTRACT

A transfer film (1) having a print pattern is floated on a liquid surface (12A) within a transfer bath and a transfer objective body (2) is immersed into a liquid (12) within the transfer bath together with the transfer film (1) whereby the print pattern on the transfer film (1) is transferred onto the surface of the transfer objective body (2) using a liquid pressure. The surface portion of the transfer objective body (2) on which the print pattern should be transferred is immersed under the liquid surface (12A) while the surface portion of the transfer objective body follows the transfer film (1) so as to be developed thereon in a plane manner by rolling the surface portion of the transfer objective body (2) on the transfer film (1). The transfer surface (2*a*) of the transfer objective body (2) and the print pattern on the transfer film (1) are closely attached to each other as if they are adhered in a manner faced to each other with the same area and as a result, the print pattern is closely adhered all over the surface of the transfer objective body (2).

15 Claims, 22 Drawing Sheets

HYDRAULIC TRANSFER METHOD AND DEVICE AND HYDRAULIC-TRANSFER ARTICLE

TECHNICAL FIELD

This invention pertains to a method of printing a print pattern by transferring it on a transfer objective body having a three-dimensional surface such as a curved surface or the like by using a liquid pressure on an objective article (a body onto which the print pattern should be transferred) and more particularly, this invention pertains to a method of transferring the predetermined print pattern by using the liquid pressure on the transfer objective body having a relatively larger transfer face area such as a fender, a door, a bonnet or the like of a car, for example.

Furthermore, this invention pertains to an apparatus useful for practicing the aforementioned method and also to a liquid pressure pattern-transferred article formed by the aforementioned method.

TECHNICAL BACKGROUND

A so-called liquid pressure transfer method has been used for printing various patterns onto a transfer objective body or article having a complicated surface configuration. Typically, this liquid pressure transfer method is one in which a liquid-soluble pattern transfer film having a predetermined print pattern of no liquid solution provided thereon is floated on a surface of a liquid flowing within a transfer bath and is made swollen by the liquid and then the transfer objective body is immersed into the liquid within the transfer bath while it contacts the transfer film and has the print pattern transferred from the transfer film by using a liquid pressure.

In a prior art, the transfer objective bodies are sequentially supported on a plurality of holding frames which are mounted on a reversely triangular conveyor in a spaced manner while the reversely triangular conveyor is disposed so that a conveyor portion adjacent to an underside apex of the triangular conveyor is immersed into the liquid. The reversely triangular conveyor conveys the transfer objective bodies so that each of the objective bodies contacts the liquid within the transfer bath just before or upstream of the underside apex conveyor portion going to be immersed into the liquid, is then immersed into the liquid and leaves the liquid on the opposite side or downstream of the underside apex conveyor portion whereby the pattern-transferred objective bodies are pulled out of the transfer bath (see U.S. Pat. No. 4,436,571 specification and Japanese patent Application Publication No. 13064/1991 (JP3-13064)).

According to the prior art, the transfer objective body is immersed into the liquid with the transfer bath at a constant velocity while it is held onto the reversely triangular conveyor with the same pose maintained. Thus, it will be noted that the condition in which the surface of the transfer objective body contacts the transfer film remarkably varies in accordance with variation in a three-dimensional configuration of the surface of the transfer objective body.

More particularly, many transfer objective bodies have a surface varying in a three-dimensionally complicated manner except to a plane article. If such a whole transfer objective body is immersed into the liquid by the conveyor with the same pose maintained, the relationship of position-between the individual portions of the transfer objective body being immersed into the liquid and the transfer film floating on the transfer bath remarkably varies on the surface configuration or profile of the transfer objective body.

In case that the transfer objective body is small-sized, a radius of curvature of the surface of the transfer objective body is relatively smaller and has a smaller area of the individual portions having the three-dimensional surface different from each other even though the surface configuration of the transfer objective body largely varies or is complicated whereby the three-dimensional configuration (a curvature, for example) mutually varies. Therefore, the print pattern is transferred onto such surface portions of the transfer objective body having the three-dimensional configuration different from each other without having such remarkable variation in appearance as adversely affects the transferred pattern.

However, in case that the print pattern on the transfer film is transferred onto a relatively larger body such as a car panel including a fender, a door, a bonnet, a bumper of a car or the like by using the liquid pressure transfer method, the radius of curvature of the individual surface portions having the three-dimensional configuration different from each other is larger and as a result, the area of the individual surface portions gets larger. As such a transfer objective body is immersed into the liquid with the same pose, the print pattern is transferred onto the individual surface portions on the conditions different from each other and as a result, the transferred pattern on the whole transfer objective body is made irregular whereby the appearance of the transfer objective body tends to be deteriorated.

This tendency gets remarkable particularly in case that the surface portion of the transfer objective body which is just going to be immersed into the liquid greatly protrudes toward the liquid surface or toward the side opposite thereto. More particularly, in case that the surface portion of the transfer objective body which is just going to be immersed into the liquid greatly protrudes toward the liquid surface (or dent on the side opposite to the transfer film), the print pattern on the transfer film is extended due to the protruding surface of the transfer objective body so that the pattern is distorted (deformed) or so that the thickness or density of the ink of the print pattern is lowered. Similarly, in case that the surface portion of the transfer objective body which is just going to be immersed into the liquid greatly dents on the side opposite to the transfer film (or protrudes toward the side opposite to the transferring film), the print pattern on the transfer film is extended due to the protruding surface of the transfer objective body so that the pattern is distorted (deformed) or so that the thickness of the ink of the print pattern is lowered. Thus, in both of the aforementioned cases, the transfer objective body cannot disadvantageously provide good appearance.

Generally, the transfer film has a transferring pattern painted while it extends in a uniform direction (such as in a longitudinal direction, for example). As the printed pattern is transferred onto the transfer objective body such as a fender of a car or the like having a surface curved in a curved line, but not extending in a rectilinear line in a longitudinal direction while being used together with other transfer objective body or bodies such as a door of the car or the like having a surface extending in a rectilinear line in a longitudinal direction, the patterns transferred onto these objective bodies get disunited. Thus, an article formed of a combination of these objective bodies has an extremely poor surface appearance.

A large-sized article such as a door panel of a car is sometimes required to have along an edge of a back face thereof the same transferred pattern as that on the surface thereof in a successive manner. Such an operation of transferring on the back face cannot be effectively made by the prior art in which the transfer objective body is immersed into the liquid with the same pose.

Accordingly, it is a principal object of the invention to provide a liquid pressure transfer method and an apparatus therefor adapted to provide satisfactory transfer characteristics having no deformation and no thinner color of a transferred pattern even though a transfer objective body onto has a large-sized and complicated surface configuration.

It is another object of the invention to provide a liquid pressure transfer method and an apparatus therefor adapted to apply onto a surface of a transfer objective body a transferred pattern extending in an appropriate direction even though the transfer objective body extends not along a linear line in a longitudinal direction, but along a complicated line such as a curved line.

It is another object of the invention to provide a liquid pressure transfer method and an apparatus therefor adapted to effectively apply a transferred pattern not only onto a surface of a transfer objective body, but also onto a back face succeeding the surface thereof.

It is another object of the invention to provide a liquid pressure transfer apparatus adapted to effectively apply a transferred pattern onto a transfer objective body having a large-sized and complicated configuration.

It is another object of the invention to provide a liquid pressure pattern-transferred article having a good appearance without making a transferred pattern unclear or without disarranging the transferred pattern relative to a direction in which the transfer objective body extends although it has a large sized and complicated configuration.

DISCLOSURE OF THE INVENTION

Firstly, this invention pertains to an improvement on a liquid pressure transfer method of transferring a print pattern on a transfer film floating on a surface of a liquid within a transfer bath by immersing a transfer objective body into the liquid while it is faced to the transfer film. This method may be of a transfer film feeding system in which the transfer film is fed on the surface of the liquid within the transfer bath at a given feeding velocity or of a transfer film stationary system in which the transfer film floats on the surface of the liquid within the transfer bath in a stationary manner while is placed on the liquid surface by a batch system. Since an activator is sprayed onto the transfer film on the surface of the liquid within the transfer bath by using a sprayer or the like so as to make an ink of the print pattern humid, the condition in which the ink on the transferred film is activated never varies on the area portions thereof and thus the area where the transfer objective body is immersed into the liquid may be set voluntarily.

A first method of the invention is to fundamentally immerse a transfer objective body into a liquid while a pose of the transfer objective body is controlled so that the transfer objective body contacts the surface of the transfer film following the transfer objective body whereby the surface of the transfer objective body onto which a print pattern should be transferred is developed on the surface of the transfer film in a plane manner relative thereto.

This can be ideally accomplished by supposing an imaginary development face on the transfer film within the transfer bath so as to be identical to a face obtained by developing in a plane manner the surface of the transfer objective body onto which the print pattern should be transferred and then immersing the transfer objective body into the liquid while the pose of the transfer objective body is so controlled that the surface of the transfer objective body follows the surface of the transfer film whereby the transfer surface of the transfer objective body is identical to the imaginary development on the transfer film. However, since it is difficult that the transfer surface of the transfer objective body follows the surface of the transfer film in the same manner as it does ideally, the transfer surface of the transfer objective body will practically follow the surface of the transfer film in the almost ideal condition.

In one embodiment of the invention, this can be accomplished by sequentially rolling on the surface of the transfer film the face of the transfer objective body onto which the print pattern should be transferred (which will be referred to as “transfer face”, “decoration face” or “design face” hereinafter) so that the transfer surface of the transfer objective body is substantially identical to the imaginary development face on the transfer film.

Rolling the transfer objective body may be made preferably in all radial directions of the transfer objective body, but as it tries to be made in all the radial directions, the pose of the transfer objective body when immersed will get complicated. Thus, in practice, rolling will be made along a central cross section in its longitudinal direction and its transverse direction for every large-sized surface portion of the transfer objective body forming the surface configuration of the transfer objective body just contacting the liquid.

A system of rolling the transfer objective body will effectively work in case that the transfer face of the transfer objective body (decoration face or design face) is only on the surface (front face) thereof, but in case that the transfer face of the transfer objective body is also on a back face, rolling will not work on this back transfer face.

Another embodiment of the invention described herein just below will effectively work for such a back transfer face. In this embodiment, the transfer objective body enters the liquid while it is lowered in such a condition as the surface of the transfer objective body is inclined and with one of the edges of the transfer objective body being directed toward the surface of the transfer film and thereafter it is immersed into the liquid while it is lowered obliquely downward with a such a pose as the transfer face of the transfer objective body contacts the transfer film while it follows the surface of the transfer film so that the surface of the transfer objective body is developed on the surface of the transfer film in a plane manner. As one of the edges is lowered and enters the liquid together with the transfer film, a portion of the transfer film succeeding the portion of the transfer film adhering to the surface of the transfer objective body is drawn closer to the edge of the back face of the transfer objective body so as to cover the edge of the back face until the print pattern on the transfer film is successively transferred on the surface and back face of the transfer objective body.

Thereafter, as the transfer objective body is lowered into the liquid obliquely downward while the transfer objective body is maintained in the inclined condition, the front transfer face of the transfer objective body enters the liquid while contacting the surface of the transfer film as if the front transfer face is developed in a plane manner on the surface of the transfer film portion succeeding the transfer film portion adhering to the back edge of the transfer objective body.

Thus, as the transfer objective body is developed on the transfer film by such a transfer objective body oblique lowering system, there can be provided the transfer objective body having a decoration faces succeeding on the front face and the back face of the transfer objective body.

In either of the transfer rolling system and the transfer objective body oblique lowering system, the transfer objective body is required to enter the liquid so that no air pocket is formed between the surface of the transfer objective body and the transfer film. This can be accomplished by an operation in which the transfer objective body enters the liquid without closing a dent possibly forming the air pocket. This can prevent air from being involved in the dent.

In case that the method of the invention is of a transfer film feeding system in which the transfer film is successively fed into the transfer bath, the transfer objective body should enter the liquid preferably at a position most suitable for transferring the print pattern with the transfer film perfectly activated within the transfer bath and then fully swollen by the liquid within the transfer bath. If the liquid entrance position of the transfer objective body is shifted on an upstream side in a direction of feeding the transfer film, the print pattern will be transferred in the condition in which the transfer film is not perfectly activated and the ink of the print pattern is not swollen, which causes undesirable pattern discontinuation and wrinkles of the transferred pattern to occur.

Also, in case that the method of the invention is of a transfer film feeding system in which the transfer film is successively fed into the transfer bath, the transfer objective body desirably enters the liquid so that the surface of the transfer objective body contacts the transfer film at a velocity corresponding to the feeding velocity of the transfer film.

However, in the invention, the liquid entrance velocity of the transfer objective body is not required to correspond to the feeding velocity of the transfer film in all cases, but in some cases, it may be later or earlier than the feeding velocity of the transfer film in accordance with liquid entrance conditions such as a liquid entrance angle of the transfer objective body or arbitrarily. Arbitrary variation in the liquid entrance velocity may be made in case that a color tone of the whole decoration face of the transfer objective body is required to vary or the pattern is required to be adjusted, for example.

Furthermore, the transfer face portion of the transfer objective body ideally enters the liquid while it follows the transfer film so as to be developed on the transfer film in a plane manner and it is also required to consider that no air is involved between the transfer objective body and the transfer film. To this end, an angle (liquid entrance angle) of the surface portion of the transfer objective body just entering the liquid relative to the liquid surface may be set preferably from 10° through 170°.

If the liquid entrance angle is less than 10°, the air will be easily involved while if the liquid entrance angle is more than 170°, the transfer film will be poorly wrapped whereby the pattern discontinuation undesirably tends to occur.

The liquid entrance angle of 10° or more than to less than 90° implies that the transfer face portion of the transfer objective body enters the liquid while it is inclined in the same direction as the direction of feeding the transfer film, the liquid entrance angle of over 90° to 170° implies that the transfer face portion of the transfer objective body enters the liquid while it is inclined in the direction reverse to the direction of feeding the transfer film and the liquid entrance angle of 90° implies that the transfer face portion of the transfer objective body enters the liquid at a right angle relative to the liquid surface.

In case that the transfer face portion of the transfer objective body extends not only over the front face thereof, but also along the edge of the back face succeeding the front face of the transfer objective body, it is required to enter the liquid so that the transfer film is wrapped around the transfer back face (the back edge) as already described. Also in this case, the liquid entrance angle should be set from 10° through 170°.

As the transfer face of the transfer objective body has a dent in the condition that the transfer objective body enters the liquid in an inclined manner at the normal entrance angle while the transfer face including the dent is closed relative to the liquid surface, the air pocket will be formed between the face portion including the dent and the transfer film. Therefore, in this case, the transfer objective body is required to enter the liquid while the transfer face portion is directed upwardly relative to the liquid surface so that the transfer face portion corresponding to the edge of the dent (a border portion) is never closed. In this manner, no air remains in the dent and as a result, the print pattern is prevented from being not adhered to the transfer face of the transfer objective body due to the formation of the air pocket.

Preferably, the transfer objective body may have a plurality of sections divided on the just entering surface portion thereof along the longitudinal direction. There may be set each of the sections for every different surface configuration such as every portion having a protrusion on the side of the transfer film, every portion having a dent thereon or every portion having a protrusion or a dent, but having variation in the radius of curvature, for example. The liquid entrance conditions such as the liquid entrance pose (including the liquid entrance angle), the liquid entrance velocity and so on are set for every section in accordance with the surface configuration of every section.

The method of the invention may be accomplished by previously storing the liquid entrance conditions such as a pose mode in which the transfer objective body enters the liquid so that the transfer objective body follows the transfer film while the transfer face portion of the transfer objective body is developed on the transfer film in a plane manner, a substantially constant liquid contact position where the surface portion of the transfer objective body contacts the liquid if necessary (in case of the transfer film feeding system), the liquid entrance velocity, which are set for every surface portion such as the section of the transfer objective body) just entering the liquid and conveying the transfer objective body while the liquid entrance pose and so on are controlled for every the surface portion of the transfer objective body in accordance with the previously stored data.

The pose mode when the transfer objective body enters the liquid may be preferably set for every section and therefore transfer objective body conveyance control means stores the pose mode different for every section and controls the conveyance pose of the transfer objective body based on the pose mode set for every section just entering the liquid within the transfer bath.

Secondly, this invention pertains to a liquid pressure transfer apparatus comprising a transfer bath to float a transfer film having a predetermined print pattern and transfer the print pattern on a transfer objective body while a liquid pressure is applied to the transfer objective body and transfer objective conveyance means to convey the transfer objective body so that the surface portions of the transfer objective body sequentially enter the liquid in a manner faced to the transfer film within the transfer bath whereby the print pattern on the transfer film is transferred onto the transfer objective body using the liquid pressure and then move the pattern-transferred surface portions of the transfer objective body away from the liquid surface within the transfer bath whereby the transfer objective body is sequentially taken out of the transfer bath.

The apparatus of the invention is characterized by including transfer objective body conveyance control means to control a pose of the transfer objective body so that the transfer face of the transfer objective body enters the liquid while the transfer objective body follows the transfer film so that the transfer face of the transfer objective body is developed onto the surface of the transfer film within the transfer bath in a plane manner.

In the apparatus of the invention, the transfer objective body conveyance control means is so constructed as to control the entrance of the transfer objective body into the liquid by the aforementioned method. This transfer objective body conveyance control means conveys the transfer objective body while controlling the pose of the transfer objective body so that the transfer objective body enters the liquid while it is contacting the transfer film with the pose of the transfer objective body rolling system or the transfer objective body oblique lowering system.

In the transfer objective body conveyance control means, the liquid entrance conditions of the transfer objective body may be preferably set for each of a plurality of sections into which the transfer objective body is divided along the liquid entrance direction. The sections may be individually formed based on the portions which have a surface configuration largely different from each other and the central line of each of the sections should be set while right and left three-dimensional configurations of each of the transfer objective body sections are considered so that they are balanced in a transverse direction.

The transfer objective body conveyance control means previously stores the liquid entrance conditions such as the pose mode (including the liquid entrance angle) set so that every transfer face portion of the transfer objective body enters the liquid while it is developed on the transfer film in a plane manner, the predetermined liquid entrance velocity set for every transfer face portion, a liquid contact position (in case of the transfer film feeding system) set for every transfer face portion and so on and controls the poses of the transfer objective body and other conditions on the conveyance of the transfer objective body based on the data previously stored in this manner.

As already described, the liquid entrance conditions including the pose mode and so on when the transfer objective body enters the liquid may be preferably set for every section and therefore the transfer objective body conveyance control means stores the pose mode different for every section and controls the conveyance pose of the transfer objective body based on the pose mode set for every section just entering the liquid within the transfer bath.

Since the transfer objective body has the liquid entrance pose varied whenever the end of each of the sections reaches the liquid, as the transfer objective body is controlled based on the variation in the liquid entrance pose, the transfer objective body will be conveyed in a stepped manner because it is subject to abrupt variation in the liquid entrance pose and so on whenever the liquid entrance of the transfer objective body changed from one section to another section. In order to avoid this, the transfer objective body conveyance control means preferably controls the conveyance of the transfer objective body so that the liquid entrance pose and so on vary in a smooth manner by applying a smoothing command to the transfer objective body conveyance control means before and after the sections are switched.

In the apparatus of the invention, the transfer objective body conveyance means may preferably comprise a plurality of carrying-in transfer objective body conveyance units disposed in a manner spaced to each other in a position adjacent to a liquid contact position of the transfer bath where the transfer object body contacts the liquid and at least one carrying-out transfer objective body conveyance unit disposed in a position adjacent to a transfer objective body taking out position of the transfer bath.

Thirdly, this invention pertains to a liquid pressure pattern-transferred article which is characterized by being formed by transferring the print pattern onto the transfer objective body by the aforementioned method.

The transfer objective body to which the invention may be applied is an article of which the liquid entrance face contacts the surface of the transfer film with the contact area remarkably different from each other if it enters the liquid with the same pose maintained and there are a fender, a door, a bonnet, a bumper of a small-sized car and so on as such an article. It should be noted that such an article may include one used in various fields other than the outer panels of the car.

In this manner, as the pose of the transfer objective body is controlled so that the face (transfer face) of the transfer objective body onto which the print pattern should be transferred enters the liquid while it follows the transfer film so that the transfer face is developed on the surface of the transfer film in the plane manner, in case that the transfer objective body is a large-sized one such as the car panel including the fender, the door or the bonnet of the small-sized car, for example, which has a large radius of curvature, a large area of the curved portion and large areas of adjacent portions on both sides of the curved portion even though it has a small value of angle variation of the curved portion, the transfer objective body enters the liquid while all the surface portions of the transfer objective body contact the surface of the transfer film with the substantially identical contact area in accordance with variation in the surface configuration of the transfer objective body so that the print pattern on the transfer film is transferred onto the surface of the transfer objective body. This prevents the print pattern which should be transferred from being extended and thinned in its color. This allows the print pattern to be satisfactorily attached all over the surface portions of the transfer objective body and therefore the pattern transferred onto the transfer objective body is maintained uniformly and an intended expression of design can be obtained on the transfer objective body.

A movement of the transfer objective body for contacting the transfer film while it follows the transfer film so as to be developed thereon can be easily accomplished by rolling the transfer face of the transfer objective body on the surface of the transfer film or lowering the transfer objective body obliquely downward relative to the surface of the transfer film.

Even though the transfer face of the transfer objective body has a dent, the transfer objective body can enter the liquid while the transfer face thereof is opened when the edge of the dent enters the liquid. This can effectively avoid such an air pocket as obstructs the print pattern from being closely attached to the transfer objective body.

As the liquid entrance conditions such as the liquid entrance pose (including the liquid entrance angle), the liquid entrance position, the liquid entrance velocity or the like are set for each of a plurality of sections into which the transfer objective body is divided for the portions which have a surface configuration largely different from each other, the conditions necessary for entering the liquid in the same conditions as the transfer face of the transfer objective body is developed on the surface of the transfer film in the plane manner can be easily obtained and as a result, the liquid entrance of the transfer objective body can be easily controlled.

In the liquid pressure transfer technique according to the transfer film feeding system, as the transfer face of the transfer objective body is so set to enter the liquid at the substantially identical position (the liquid entrance position) in the direction in which the liquid flows, the transfer objective body immersed into the liquid at the position where the ink forming the print pattern on the transfer film always has a uniform degree of re-tackiness and a uniform degree of swell. This serves to improve the transfer characteristics together with the principle that the surface of the transfer objective body enters the liquid while it contacts the transfer film in a plane manner.

Furthermore, as the liquid entrance conditions such as the pose modes (including the liquid entrance angle) set so that every transfer face portion of the transfer objective body enters the liquid while it is developed on the transfer film in the plane manner, the substantially constant liquid entrance position where the face portion of the transfer objective body enters the liquid and the predetermined liquid entrance velocity set for every transfer face portion (the two latters thereof set only in case of the transfer film feeding system) are previously stored and as the liquid entrance conditions such as the poses of the transfer objective body on the conveyance of the transfer objective body are controlled in accordance with the previously stored data, the operation of transferring the print pattern on various transfer objective bodies can be promptly made by changing record medium having the liquid entrance conditions previously stored for every kind of the transfer objective body or by switching the areas in which the data are written.

The data written areas may be switched on an identification which can be made by detecting an indication such as hole, notch or the like provided in a holder for the transfer objective body by a suitable detector such as a proximity switch, a limit switch or an optical switch (sensor) so that the kind of the transfer objective bodies (articles) on the holder therefor is recognized.

In the apparatus of the invention, as the transfer objective body conveyance means comprises the plurality of carrying-in transfer objective body conveyance units disposed in a manner spaced to each other in the position adjacent to the transfer objective body liquid entrance position of the transfer bath and at least one carrying-out transfer objective body conveyance unit disposed in the position adjacent to the transfer objective body taking out position of the transfer bath, the plurality of the carrying-in transfer objective body conveyance units can be alternately used for sequentially carrying in each one of the transfer objective bodies to the transfer objective body liquid entrance area and deliver these transfer objective bodies to the carrying-out transfer objective body conveyance unit at the transfer objective body liquid take-off area.

Thus, one of the carrying-in transfer objective body conveyance units which previously carries in the transfer objective body can be rapidly returned to the carrying-in start position while another carrying-in transfer objective body conveyance unit is carrying in the next transfer objective body and therefore, the number of the transfer objective bodies onto which the print pattern should be transferred per unit time can increase whereby the liquid pressure transfer operation can be more effectively made.

In particular, since the moving velocity of the carrying-in transfer objective body conveyance units is relatively later after the transfer objective body enters the liquid until it leaves the liquid (while it is immersed into the liquid), if the transfer operation would be made for many transfer objective bodies using only one carrying-in transfer objective body conveyance unit, it will take much time that the single transfer objective body conveyance unit carries in the transfer objective body and delivers the pattern-transferred objective body to the carrying-out transfer objective body conveyance unit. Thus, the transfer operation for the adjacent transfer objective bodies cannot be over in short time. However, with the plurality of carrying-in transfer objective body conveyance units used, while one of the carrying-in transfer objective body conveyance units is carrying in the transfer objective body, the other carrying-in transfer objective body conveyance unit can be rapidly returned to the carrying-in start position. Therefore, the next transfer objective body can be soon carried in to the transfer position succeeding the former transfer objective body. Thus, it will be noted that the print pattern can be more effectively transferred onto more transfer objective bodies with a relatively shorter space by the two carrying-in transfer objective body conveyance units.

As the liquid pressure transferred articles are produced with the liquid entrance surface portion of the transfer objective body immersed into the liquid with such a pose as the surface portion is developed on the surface of the transfer film in the plane manner, it can have a good appearance without any obscure pattern transferred even though it has a large sized and complicated configuration.

BRIEF DESCRIPTION OF THE DRAWINGS

FIG. 13 illustrates a process of setting different sections wherein

BEST MODE FOR EMBODYING THE INVENTION

Figure 1:
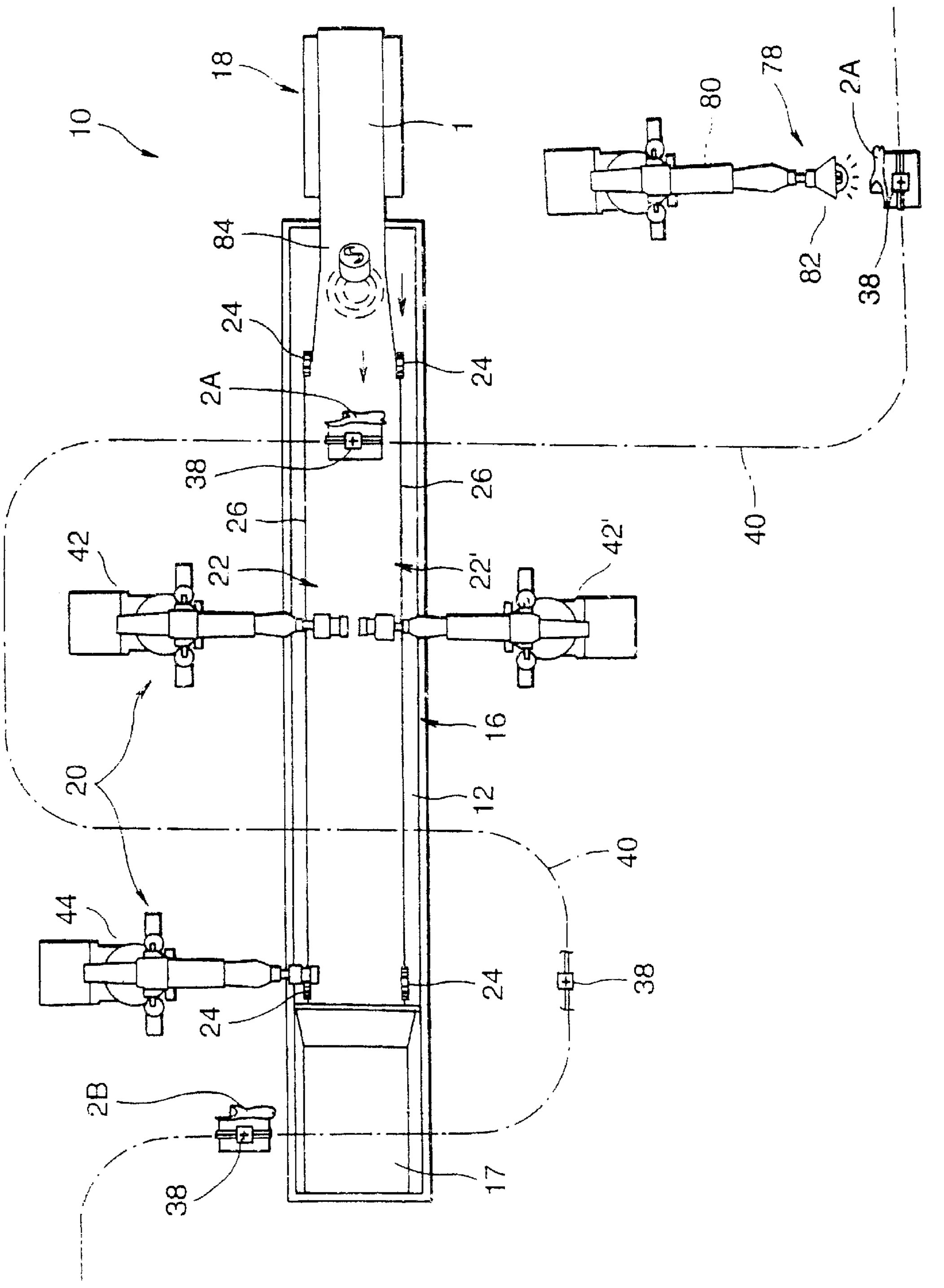
FIG. 1 is a plane view of a summary system of a liquid pressure transfer apparatus of the invention.
Figure 2:
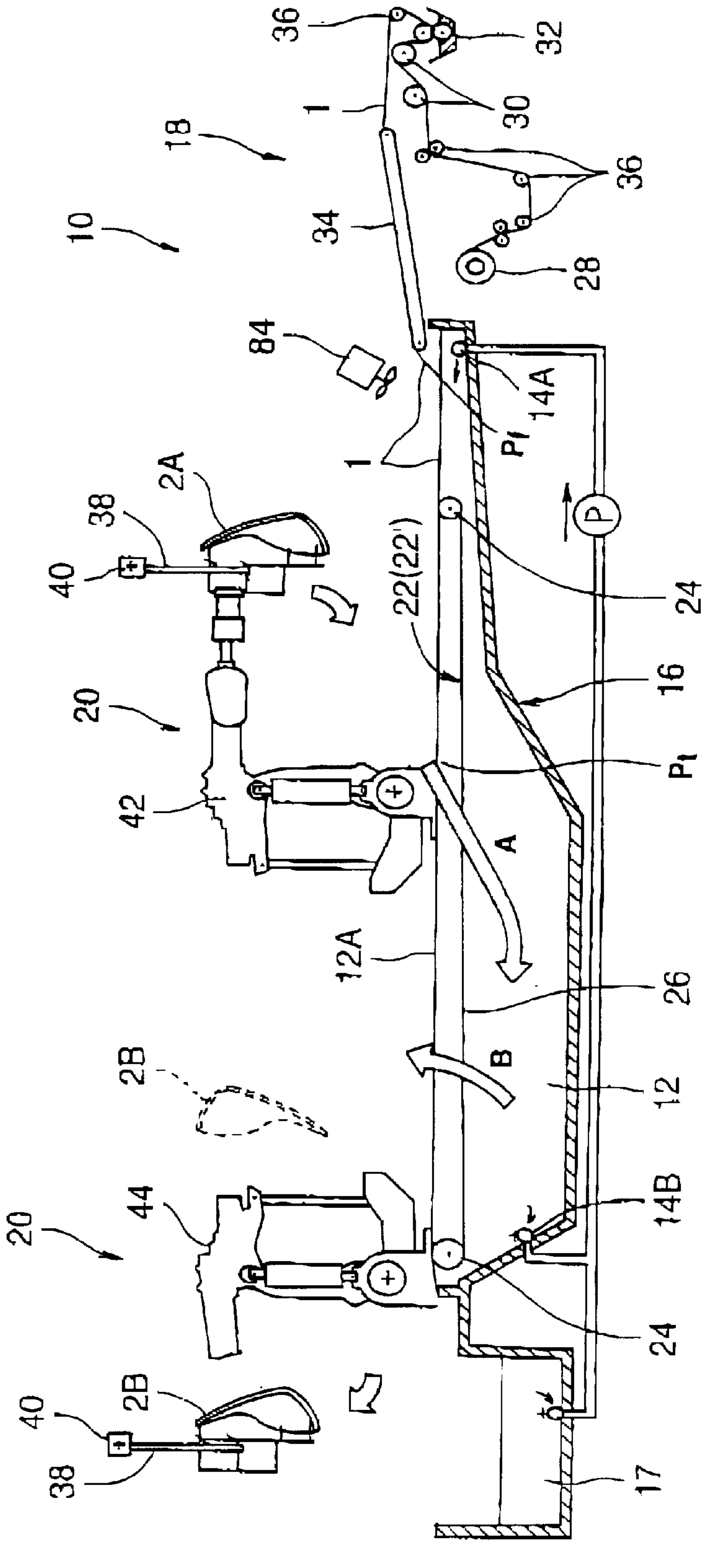
FIG. 2 is side elevational view of a transfer bath and transfer objective body conveyance units on a liquid entrance side and on a liquid take-off side which are used for the apparatus of the invention with the transfer bath taken in longitudinal section while the relationship of position thereof is illustrated.

Describing a mode embodying the present invention with reference with the drawings, FIGS. 1 and 2 schematically illustrate a liquid pressure transfer apparatus 10 of the invention and the apparatus 10 comprises a transfer bath 16 through and within which a liquid 12 such as water, as a typical example flows from an inlet 14A toward an outlet 14B at a given velocity, a transfer film supply means 18 for sequentially supplying a transfer film 1 having a predetermined print pattern so as to float on a liquid surface 12A within the transfer bath 16 and a transfer objective body conveyance means 20 to supply within the transfer bath a transfer objective body onto which the print pattern is not yet transferred and take out a transfer objective body 2B onto which the print pattern is transferred.

In the invention, "liquid" may be typically water, but it may be other than water which can swell and dissolve the transfer film 1 without adversely affecting the ink of the print pattern on the transfer film 1.

The transfer bath may have a liquid temperature setting device not shown within it. The liquid temperature setting device serves to maintain the uniform temperature of the liquid 12 flowing within the transfer bath. The transfer bath 16 is provided on both sides thereof with film guides 22 and 22', which may comprise an endless guide member 26 such as a belt, a chain or the like provided around a guide drive portion 24 such as a pulley, a sprocket or the like not shown and moving at a velocity corresponding to the supplying velocity of the transfer film 1.

These film guides 22 and 22' engage and guide both edges of the transfer film 1 swollen on the liquid surface 12A so as to feed both edges at a velocity corresponding to the feeding velocity of the transfer film 1 whereby the transfer film 1 is fed at a predetermined identical velocity over the whole width thereof with the result that it is prevented from distorting the print pattern on the transfer film 1.

In FIGS. 1 and 2, a reference numeral 17 designates a overflow bath which overflows the liquid when the liquid within the transfer bath 16 exceeds a predetermined liquid level.

As shown in FIG. 2, the transfer film supply means 18 may comprise a transfer film supply 28, a supply roller group 30, an activator coating bath 32 to coat an activator on the print pattern on the transfer film 1 so as to swell and activate it, a conveyance member 34 to convey the transfer film 1 from the activator coating bath to the liquid surface 12A within the transfer bath 16 at a given velocity. Guide rollers 36 may be disposed between the transfer film supply 28 and the supply roller group 30 and between the activator coating bath 32 and the conveyance member 34, respectively.

As shown in FIGS. 1 and 2, the transfer film 1 floating on the liquid surface 12A within the transfer bath 16 may be obliquely subject to an air pressure from an upstream side toward a downstream side by a blower 84. The blower 84 serves to extend wrinkles in a uniform manner when the transfer film 1 is swollen and also apply an initial drive power to the transfer film 1. Although the transfer film 1 may be also driven by the blower 84 and the flow of the liquid 12, fundamentally it may be controlled to be finally fed by the film guides 22 and 22' as aforementioned.

As particularly shown in FIG. 1, the transfer objective body conveyance means 20 may comprise a conveyance passage 40 having a chain extending across the transfer bath 16 in the form of S shape and including a plurality of suspending members 38 provided in a spaced manner to suspend the transfer objective bodies 2, a plurality (a pair) of carrying-in transfer objective body conveyance units 42 and 42' disposed on both sides of the transfer bath 16 at a position adjacent to the liquid entrance position of the transfer objective body in a manner spaced to receive the untransferred objective body 2A from one of the suspending members 38 on the conveyance passage 40 and at least one carrying-out, transfer objective body conveyance unit 44 disposed at a position where the transfer objective body leaves the liquid within the transfer bath 16 to return the pattern-transferred objective body 2B to the suspending member 38.

Figure 3:
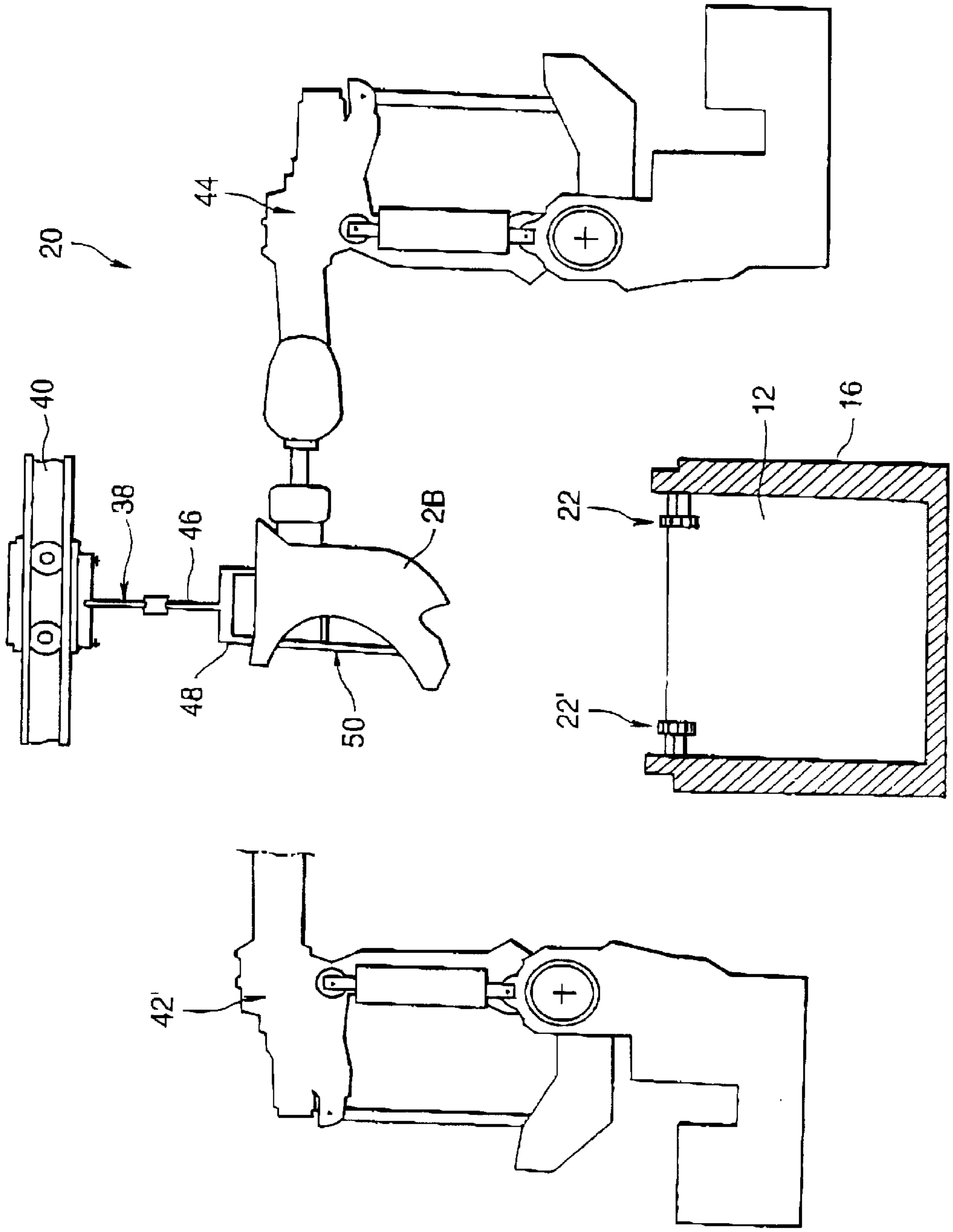
FIG. 3 illustrates the relationship of position of FIG. 2 as viewed from an upstream side with the transfer bath taken in cross section.
Figure 10:
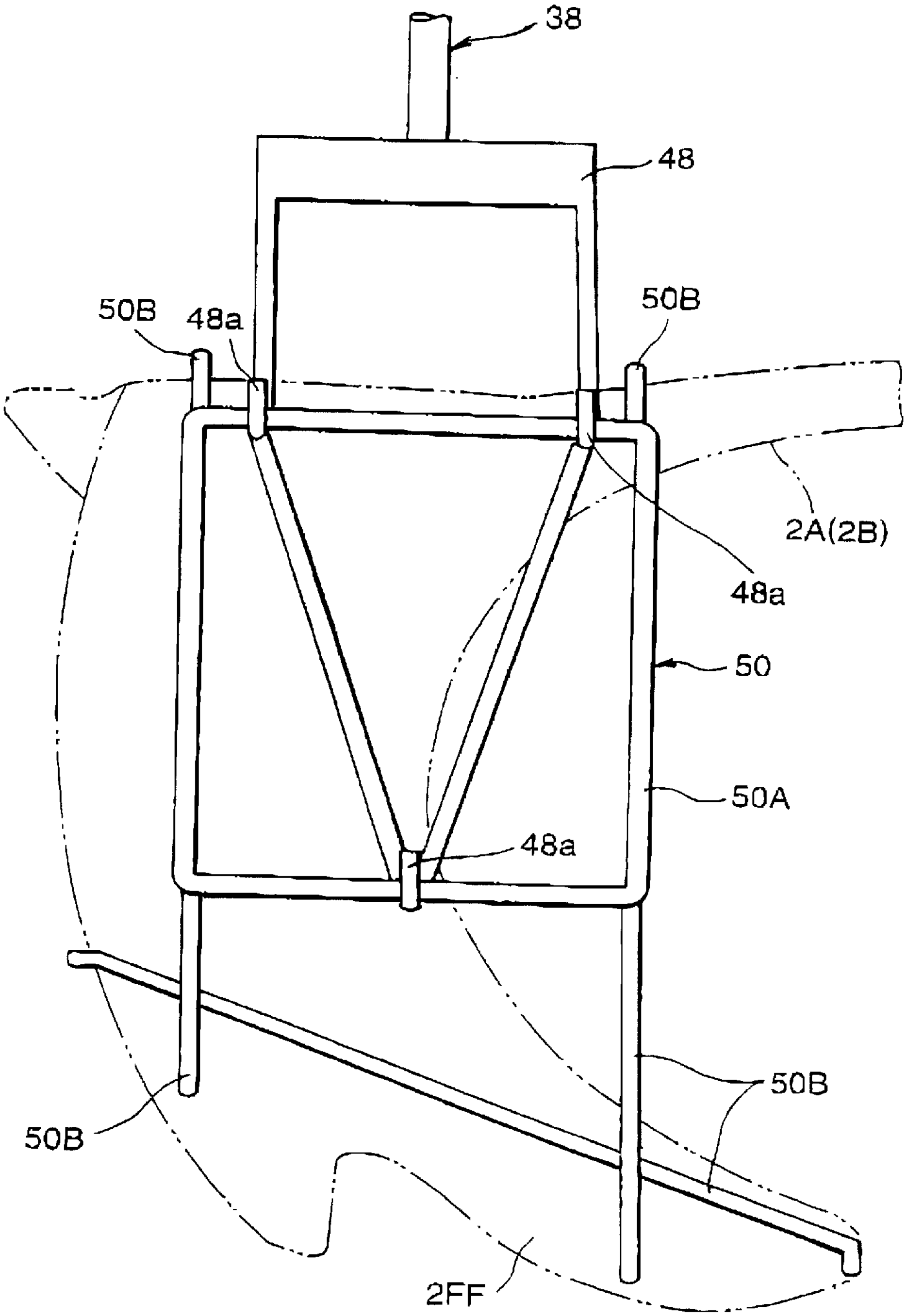
FIG. 10 is a front view of a holder for the transfer objective body holding the front fender panel of the car and a suspending member to suspend the holder together with the relationship of position thereof as viewed from the upstream side.
Figure 11:
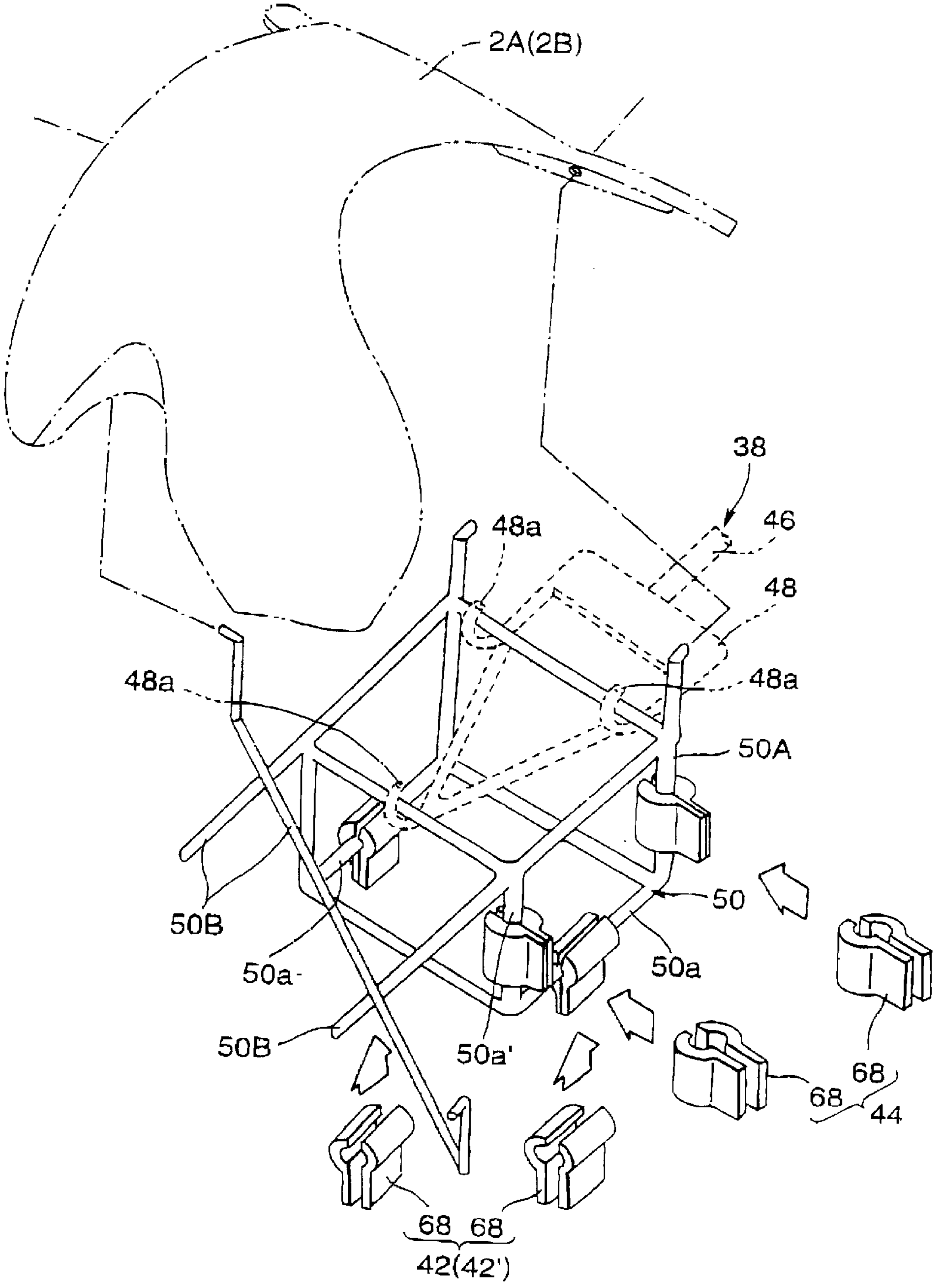
FIG. 11 is identical to FIG. 10 with respect to the relationship of position of the transfer objective body, the holder and the suspending member, but illustrates the transfer objective body removed out of the holder and the holder grasped by a finger grasper of the transfer objective body conveyance unit as viewed from the front face (upstream direction)

In the illustrated mode, as shown in FIGS. 3, 10 and 11, a suspending rod 46 and a substantially triangular suspending frame 48 provided integrally with the suspending rod 46 having hook-shaped hooking portions 48*a* provided at tops of the suspending frame 48.

Each of the transfer objective bodies 2 may be held by suitable means on a transfer objective body holder 50 having a structure which will be described later with respect to the particular transfer objective body 2A or 2*b* (both are totally designated by a reference numeral 2) with reference to FIGS. 10 and 11. The transfer objective body holder 50 may be suspended by hooking a frame portion thereof on one of the hook-shaped hooking portions 48*a* of the suspending member 48.

Figure 4:
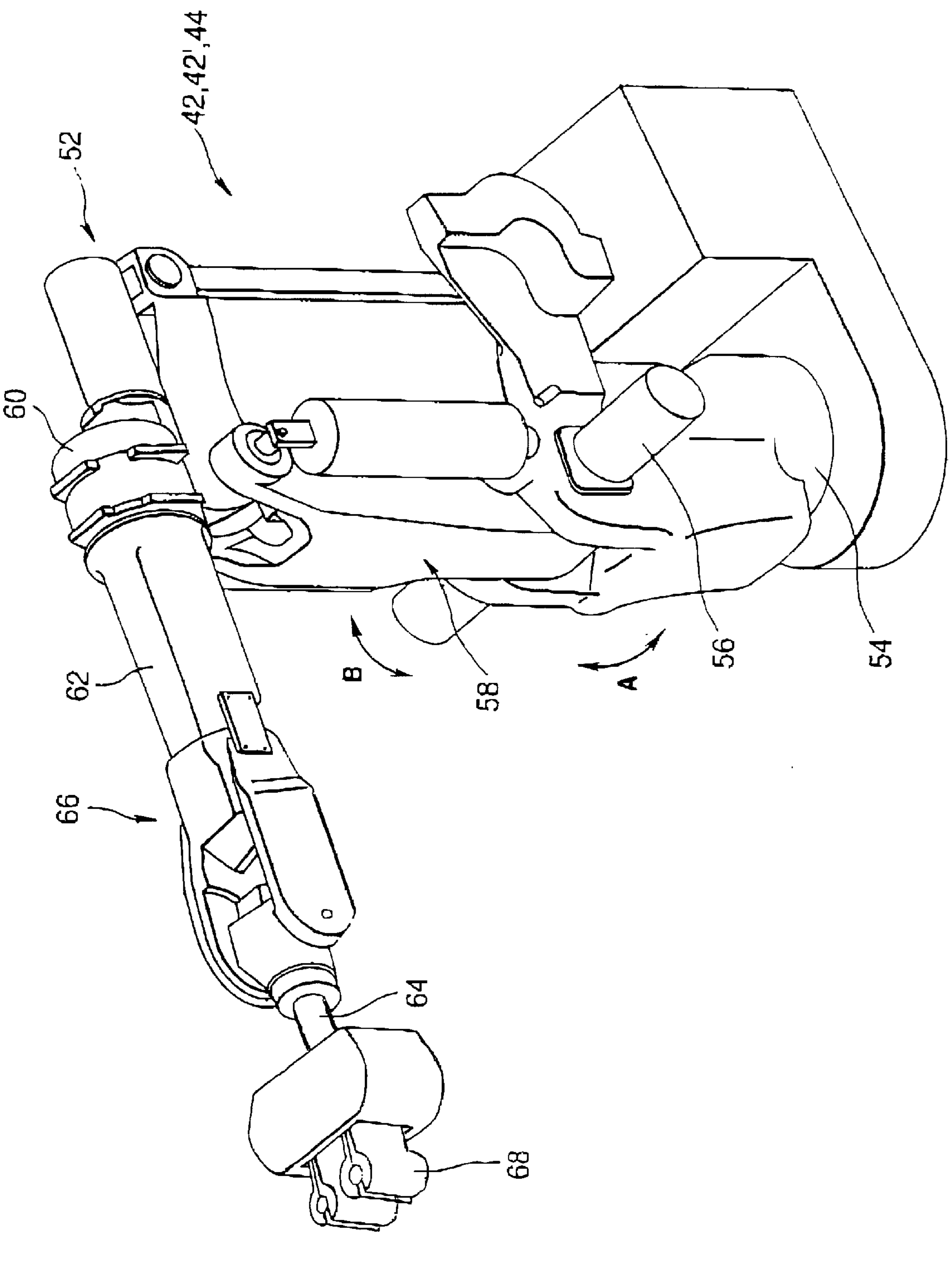
FIG. 4 is an enlarged perspective view of a multi-joint type manipulator as one example of the transfer conveyance unit used for the invention.

In the illustrated mode, all of the carrying-in transfer objective body conveyance units 42 and 42' and the carrying-out transfer objective body conveyance unit 44 may comprise a multi-joint type manipulator (robot) 52 as shown in FIG. 4.

The multi-joint type manipulator 52 may comprise a main body 58 having a horizontally turning mechanism 54 to turn it as indicated by an arrow “A” and a vertically turning mechanism 56 to turn it as indicated by an arrow “B”, an arm support 60 supported on the main body 58 pivotally in a vertical direction, an arm group 66 including a first arm 62 supported on the arm support 60 to swing about its axis and a second arm 64 provided at a leading end of the first arm 62 to swing on a vertical face along the arm 64 and a finger grasper 68 provided at a leading end of the second arm 64 to swing on a vertical face crossing the second arm 64 to grasp the pattern-untransferred objective body 2A and the pattern-transferred objective body 2B and arbitrarily change the pose of the transfer objective body 2A or 2B.

The multi-joint type manipulator 52 grasps the transfer objective body 2 by grasping the transfer objective body holder 50 holding the transfer objective body 2 by the finger grasper 68 of the manipulator 52. The carrying-in transfer objective body conveyance unit 42 or 42' comprising the multi-joint type manipulator 52 sequentially receives the pattern-untransferred objective bodies 2A from the suspending members 38 on the upstream side of the conveyance passage 40 above the transfer bath 16 and thereafter sequentially conveys them at the given velocity and with the given pose so that the surface portions of the pattern-untransferred objective bodies 2A are immersed into the liquid. The carrying-out transfer objective body conveyance unit 44 conveys the pattern-transferred objective bodies 2B so as to sequentially receive the pattern-transferred objective bodies 2B from the carrying-in transfer objective body conveyance unit 42 or 42', leave the liquid within transfer bath 16 to raise up them to a space above the transfer bath 16 and deliver them to the vacant suspending members 38 on the downstream side of the conveyance passage 40.

In the illustrated form, the transfer objective body holder 50 is shown to be in the form suitable for holding the front fender panel of the car as the transfer objective body 2.

As shown in FIGS. 10 and 11, the transfer objective body holder 50 may comprise a square main frame integrally formed of wires and a plurality of leg-like support members 50B. As described later, the main frame 50A is grasped by the finger-like grasper 68 of the transfer objective body conveyance unit 42, 42' or 44 while the support members 50B at their ends are inserted into the transfer objective body 2 (the pattern-untraneferred objective body 2A before the print pattern is transferred thereon or the pattern-transferred objective body 2B after the print pattern is transferred thereon) at suitable positions thereof to hold the transfer objective body 2A or 2B.

Figure 5:
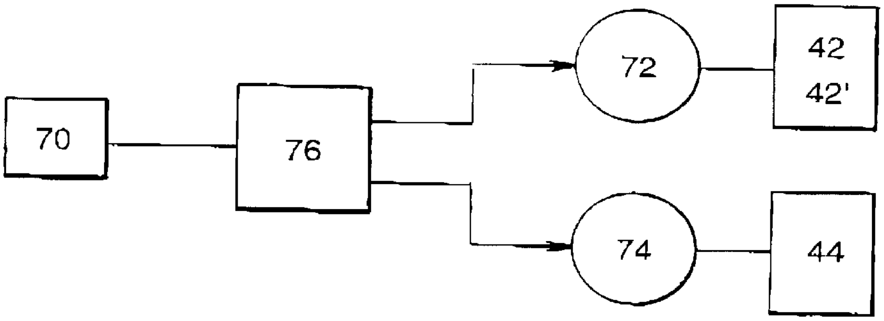
FIG. 5 is a schematic diagram of a drive system of the transfer objective body conveyance unit used for the apparatus of the invention.

As shown in FIG. 5, a transfer objective body conveyance control means 76 supplies instructions to a drive source 72 for the carrying-in transfer objective body conveyance unit 42 or 42' and to a drive source 74 for the carrying-out transfer objective body 44 in accordance with stored data from record medium 70 which stores conveyance control informations such as a liquid entrance conditions including a liquid entrance position within the transfer bath 16, a liquid entrance velocity and a liquid entrance pose (including a liquid entrance angle) and a liquid leaving or take-off pose of the transfer objective body 2 when it leaves the liquid.

Returning to FIG. 1, an upstream portion of the conveyance passage 40 relative to the transfer bath 16 (a lower passage portion of the conveyance passage on the right-hand side of FIG. 1) communicates with an apparatus 78 for applying a ultraviolet ray application treatment to the pattern-untransferred objective body 2A for various purposes while a downstream portion of the conveyance passage 40 relative to the transfer bath 16 (an upper passage portion of the conveyance passage on the left-hand side of FIG. 1) communicates with an apparatus or apparatuses for applying a post-treatment not shown such as an apparatus for cleaning the pattern-transferred objective body 2B.

As shown in FIG. 1, the ultraviolet ray application treatment apparatus 78 may comprise an ultraviolet ray lamp 82 grasped by a multi-joint type manipulator (robot) 80 similar to the multi-joint type manipulator used for the transfer objective body conveyance means 20, but the detailed description thereof will be omitted.

Figure 6:
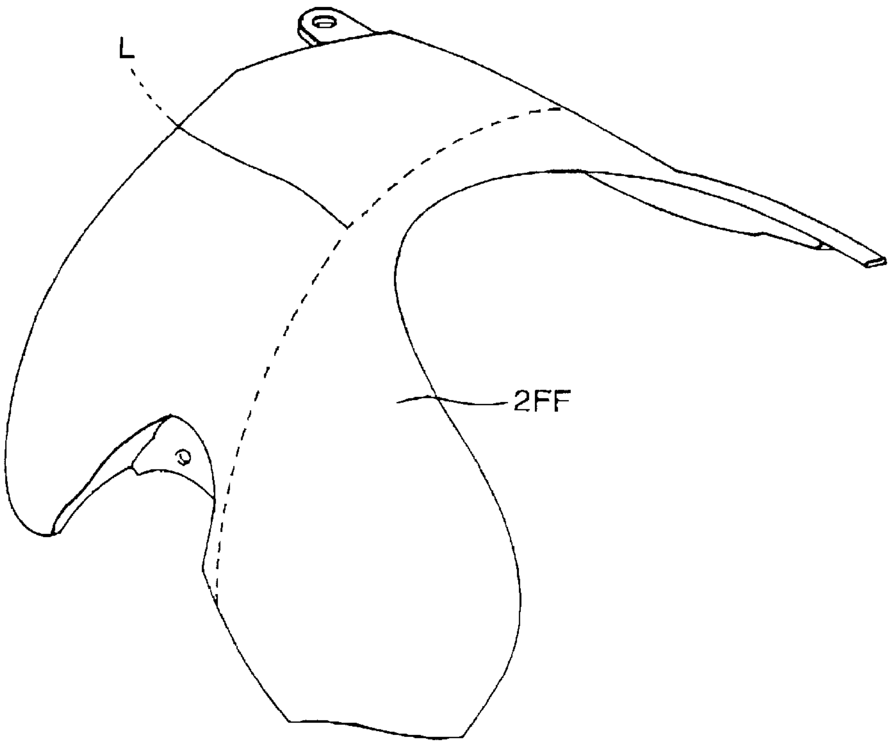
FIG. 6 is a perspective view of a front fender panel of a car illustrated as a first example of the transfer objective body.
Figure 7:
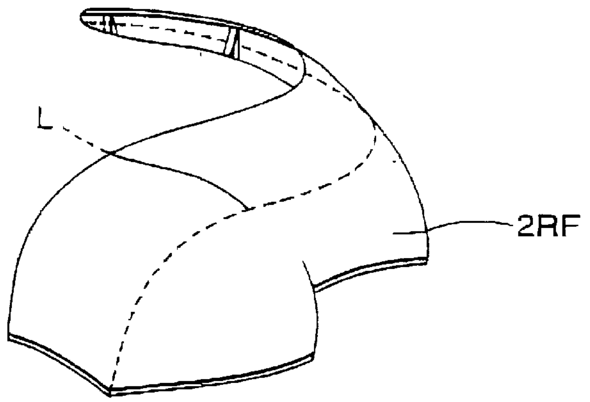
FIG. 7 is a perspective view of a rear fender panel of the car illustrated as a second example of the transfer objective body.
Figure 8:
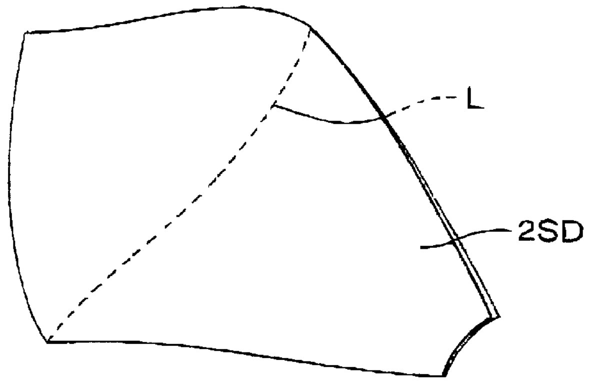
FIG. 8 is a perspective view of a side door panel of the car illustrated as a third example of the transfer objective body.
Figure 9:
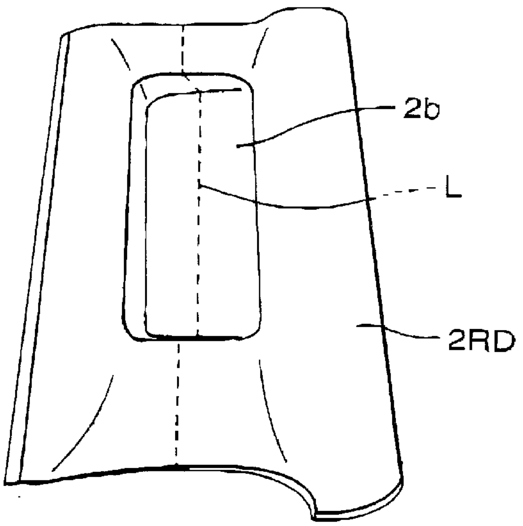
FIG. 9 is a perspective view of a rear door panel of the car illustrated as a fourth example of the transfer objective body.

The invention may be suitably applied to a transfer objective body 2 having a surface of a large-sized and complicated three-dimensional configuration such as a panel of a car as shown in FIGS. 6 through 9. The transfer objective body 2 of FIG. 6 is a front fender panel 2FF of a car, the transfer objective body 2 of FIG. 7 is a rear fender panel 2RF of the car, the transfer objective body 2 of FIG. 8 is a side door panel 2SD of the car and the transfer objective body 2 of FIG. 9 is a rear door panel 2RD of the car. The door panels 2SD and 2RD have decoration faces not only on the front face thereof, but also on the back face thereof with the back decoration face succeeding the front decoration face. Thus, these panels are required to enter the liquid so that the back face of the transfer objective body 2 contacts the transfer film 1.

Fundamentally, the liquid pressure transfer method of the invention is that the face of the transfer objective body 2 on which the print pattern should be transferred (the transfer face, decoration face or design face) enters the liquid while a pose of the transfer objective body is controlled so that the transfer face 2*a* of the transfer objective body 2 follows the transfer film 1 within the transfer bath 16 while being developed on the transfer film 1 in a plane manner. This implies that the decoration face 2*a* of the transfer objective body 2 is adhered to the surface of the transfer film 1 with the contact area not corresponding to a shadow or projection area of the three-dimensional decoration face 2*a* of the transfer objective body 2, but corresponding to the development area thereof. Thus, the print pattern on the transfer film 1 is transferred on the transfer objective body without any extension or shrinkage of the pattern and without any variation in its light and shade thereof.

Figure 12:
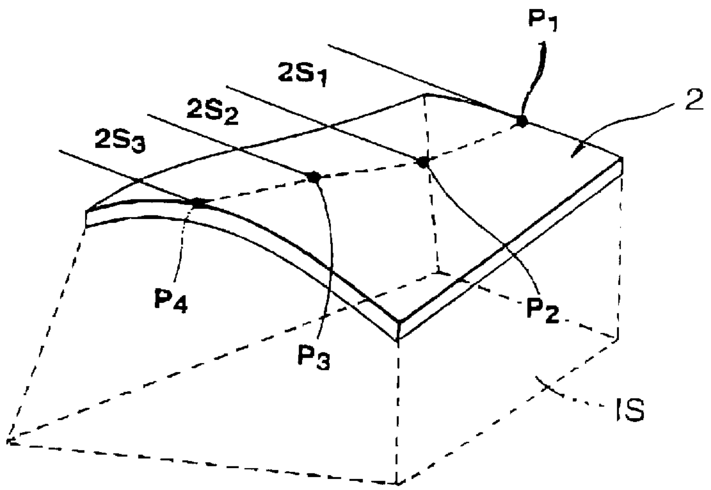
FIG. 12 illustrates a panel (a large-sized article) having a simple configuration for explanation of an example for setting the liquid entrance conditions by a section division system used for practicing the method of the invention.

Explaining a large-sized and simplified panel as shown in FIG. 12 as an example of the transfer objective body 2, the principle of the invention is accomplished by setting an imaginary development face IS obtained by imaginarily developing the decoration face 2*a* of the transfer objective body 2 on the transfer film 1 within the transfer bath 16 and immersing the transfer objective body 2 into the liquid 12 within the transfer bath 16 while the pose thereof is controlled so that the transfer face of the transfer objective body 2 follows the imaginary development face IS on the transfer film 1. In this manner, the print pattern on the transfer film 1 is adhered to the decoration face 2*a* of the transfer objective body 2 with the same area as the surface area of the development face IS. As a result, the print pattern on the transfer film 1 is never extended or shrunk on the face of the transfer objective body 2 and therefore the transferred pattern is neither distorted nor varies in light and shade of its color. This can obtain a good transfer characteristic.

In one embodiment, this invention can be accomplished by a process in which the decoration face 2*a* of the transfer objective body 2 enters the liquid while it rolls on the surface of the transfer film 1. In this manner, the decoration face 2*a* of the transfer objective body 2 follows the transfer film 1 by this rolling so that the decoration face 2*a* is developed on the transfer film 1 in a plane manner. An example of this transfer objective body rolling system will be described later with reference to FIGS. 15 through 20.

In another embodiment, this invention can be accomplished by immersing the transfer objective body 2 while it is lowered obliquely downward in a predetermined direction (a transverse direction, for example) relative to the transfer film 1 with the decoration face 2*a* of the transfer objective body 2 contacting the surface of the transfer film 1. As the transfer objective body 2 is lowered obliquely downward while the decoration face 2*a* of the transfer objective body 2 contacts the surface of the transfer film 1, the decoration face 2*a* of the transfer objective body 2 similarly follows the transfer film 1 so as to be developed thereon in a plane manner. An example of the transfer objective body oblique lowering system (a transverse movement system if it is moved in a transverse direction) will be described later with reference to FIGS. 21 through 25.

Next, a preferable concrete means for immersing the transfer objective body 2 into the liquid while the decoration face 2*a* thereof is developed on the transfer film 1 in the plane manner will be described hereinjustbelow with reference to FIGS. 12 through 14.

Preferably, the transfer objective body 2 is divided into a plurality of sections 2S along the liquid entrance direction (typically in the longitudinal direction) on the transfer face onto which the print pattern should be transferred. Each of the sections 2S is set by generally considering variation in the longitudinal curvature of the surface portions of the transfer objective body 2 and variation in a curve line of the cross section of the transfer objective body 2. The transfer objective body 2 is divided so that a range having a large curvature variation in the longitudinal direction becomes a border.

For example, in case that the transfer objective body 2 has dents and protrusions alternatively provided thereon, each of the sections 2S may be set for every surface portion having the protrusion on the side of the transfer film 1, for every surface portion having the dent on the side of the transfer film 1 or for every surface portion where the radius of curvature remarkably changes even though the protrusions or the dents appear successively on the surface portions.

Figure 13A:
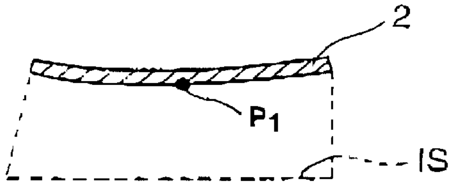
FIG. 13(A) is a cross-sectional view of a portion having a relatively plane and large radius of curvature and FIG. 13(B) is a cross sectional view of a cross section having a relatively complicated configuration and comprising a combination of a portion having a relatively small radius of curvature and a portion having a relatively large radius of curvature.
Figure 13B:
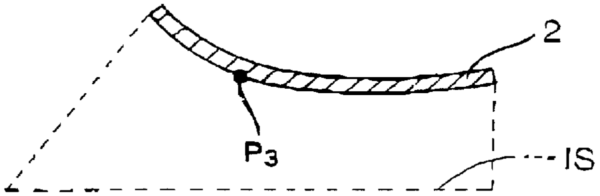

In the example of FIGS. 12 and 13, three sections 2S1 through 2S3 are formed by. dividing the decoration face 2*a* (an upper face in FIG. 12 and a lower face in FIG. 13) of the transfer objective body 2 into three portions in a longitudinal direction.

The first section 2S1 is a portion where the decoration face 2*a* is substantially plane, the second section 2S2 is a portion where the decoration face 2*a* is slightly protruding on the side of the transfer film 1 and the third section 2S3 is a portion where the decoration face 2*a* is protruding at a position biased toward one of the sides and on the side of the transfer film 1 with the curvature smaller than that of the second section 2S2.

The pose of the transfer objective body of FIG. 12 when entering the liquid is controlled for every section 2S1, 2S2 or 2S3 so that the transfer objective body 2 enters the liquid while it contacts the transfer film 1 with the surface of the transfer objective body 2 corresponding to the imaginary development face IS of FIGS. 12 and 13 imaginarily set on the transfer film 1.

Figure 14:
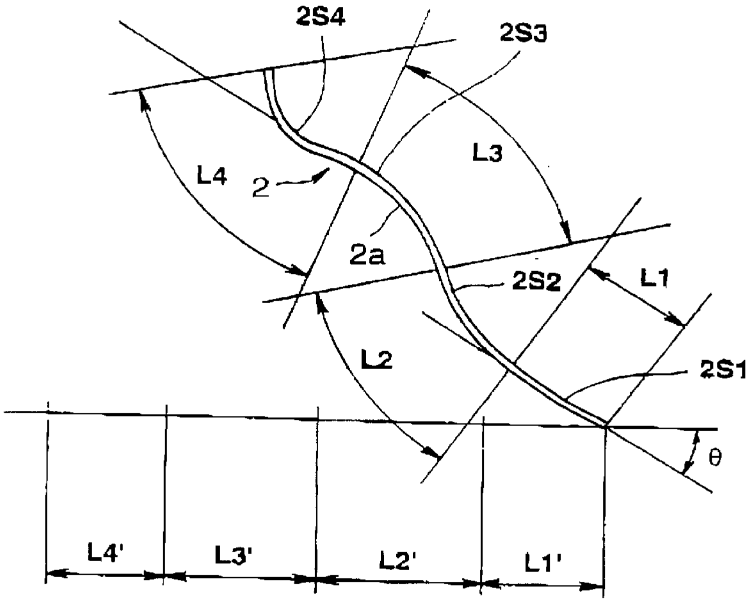
FIG. 14 illustrates a principle of the invention.

In the example of FIG. 14, first through fourth sections 2S1 through 2S4 are formed by dividing into four portions the longitudinal section obtained by cutting the decoration face 2*a* of the transfer objective body 2 along the longitudinal direction at the central portion in a transverse direction.

The first section 2S1 is a section having a plane surface portion where the longitudinal section is substantially linear, the second and fourth sections 2S2 and 2S4 are sections having a surface portion which protrudes on the side of the transfer film 1 and the third section 2S3 is a section having a surface portion which dents on the side of the transfer film 1.

The pose of the transfer objective body 2 of FIG. 14 is controlled so that the transfer objective body 2 enters the liquid 12A while the longitudinal sections of these sections 2S1 through 2S4 are developed or extended linearly.

More particularly, the first section 2S1 of the transfer objective body 2 enters the liquid while a length L1 of the longitudinal section is developed to a length L1' which corresponds to a length obtained by linearly extending the length L1. The second section 2S2 enters the liquid while an arc length L2 of the longitudinal section is developed to a length L2' which corresponds to a length obtained by linearly extending the length L2. The third section 2S3 enters the liquid while an arc length L3 of the longitudinal section is developed to a length L3' which corresponds to a length obtained by linearly extending the length L3'. The fourth section 2S4 enters the liquid while an arc length L4 of the longitudinal section is developed to a length L4' which corresponds to a length obtained by linearly extending the length L4.

In the example of FIG. 14, although the longitudinal section which is obtained by cutting the transfer objective body 2 is described, the principle of the invention may be applied to all the cut sections which are obtained in a transverse direction and in directions (radial directions) between the longitudinal direction and the transverse direction other than the longitudinal direction. However, if the principle on the liquid entrance of the invention tries to be applied to all the directions, then the pose of the transfer objective body 2 on the liquid entrance will be extremely complicated. Thus, in practice, it may be preferably applied to a central cross section in the longitudinal direction and in the traverse direction with respect to a large surface portion (an arc face, for example) forming the configuration of the surface of the transfer objective body 2 which just enters the liquid.

Although it will be considered that some sections include a portion or portions having a surface configuration which abruptly changes, if such a portion or portions as have the abruptly changing surface configuration have a small surface area, they can enter the liquid with the same pose as other portions of the same section do without adversely affecting the transferred pattern so much and therefore no further consideration needs to be taken into the entrance pose with respect to the abruptly changing surface portions.

Although the car panels 2FF, 2RF, 2SD and 2RD of FIGS. 6 through 9 as the examples of the transfer objective body 2 have only the liquid entrance center lines L shown, but any divisional sections not shown, dividing the rear fender panel 2RF into sections will be described with reference to FIG. 15.

An example of the method of the invention in which the transfer objective body is immersed into the liquid while it is developed on the transfer film by the transfer objective body rolling system will be described with reference to FIGS. 15 through 20.

Although, in the example of FIGS. 15 through 19, the print pattern is transferred onto the rear fender panel 2RF of FIG. 7 as the transfer objective body 2 under the liquid pressure, it can be transferred also onto the front fender panel of FIG. 6 as the transfer objective body under the liquid pressure by the similar transfer objective body rolling system.

Figure 15:
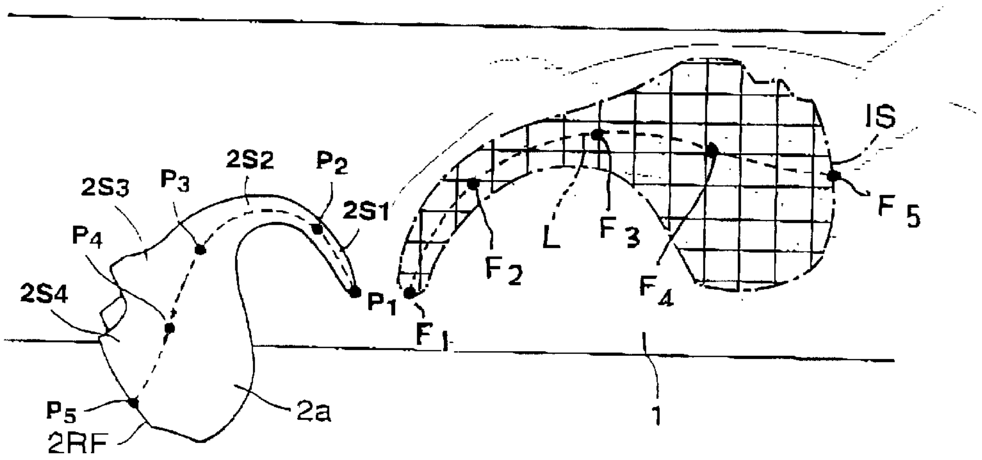
FIG. 15 illustrates a three-dimensional configuration of a rear fender panel of a car as a transfer objective body and a development face on a transfer film which the whole transfer face of the transfer objective body should contact while it rolls the transfer film so as to be developed thereon when a print pattern is transferred onto the transfer objective body for explaining a first embodiment based on the principle of the invention.

As shown in FIG. 15, no projection or shadow face of the decoration face 2*a* of the rear fender panel 2RF as the transfer objective body 2 is set on the surface of the transfer film 1, but the imaginary development face IS thereof is imaginarily set on the surface of the transfer film 1 and the transfer objective body 2 is immersed into the liquid in a controlled manner while rolling the decoration face 2*a* of the transfer objective body 2 on the surface of the transfer film 2 so that the decoration face 2*a* thereof corresponds to the imaginary development face of the transfer film 1.

Also as shown in FIG. 15, the rear fender panel 2RF sequentially enters the liquid along the longitudinal direction starting with the narrow width portion thereof. The rear fender panel 2RF is divided into four sections 2S1 through 2S4 along the liquid entrance direction (the longitudinal direction).

This panel 2RF has no decoration face having dents and protrusions alternatively appearing along the longitudinal direction as shown in FIG. 14, but has a curved face at its narrow width portion extending in a horizontal direction and at its leading portions extending in a vertical direction while they show gradually wider width. The liquid entrance points on the liquid entrance center line of the adjacent sections are designated by reference codes P1 through P5 while the corresponding liquid entrance points on the imaginary development face IS which should be imaginarily set on the transfer film 1 are designated by reference codes F1 through F5.

Since the transfer film 1 is sequentially fed from the right-hand side of FIG. 15 to the left-hand side thereof, the liquid entrance points F1 through F5 of the transfer film are sequentially fed to the positions where the liquid entrance points P1 through P5 of the panel 2RF sequentially reach the liquid as shown in FIGS. 20(A) through 20(E). Thus, the transfer objective body 2 always enters the liquid at the substantially identical liquid entrance position Pt. As noted from FIGS. 20 (D) and 20 (E), as the last section S4 enters the liquid, the former sections 2S1 and 2S2 rise up from the liquid level 12A, but since these sections 2S1 and 2S2 have the print pattern already transferred from the transfer film 1 while they are subject to the liquid pressure by being immersed into the liquid, there is no problem in the sections 2S1 and 2S2 rising up from the liquid surface. In FIG. 20, the portions of the panel 2RF lying in the air are indicated by solid lines while the portions thereof lying under the liquid surface are indicated by dotted lines. Accordingly, it will be noted from the example of FIG. 20(D) that the front and rear portions of the panel 2RF lie in the air while the middle portions thereof lie under the liquid surface, and it will be noted from the example of FIG. 20(E) that as the wider portions of the panel 2RF are immersed into the liquid, the front long and narrow portion thereof rises up from the level in the condition that the liquid pressure transfer treatment is finished at the portion.

Figure 16A:
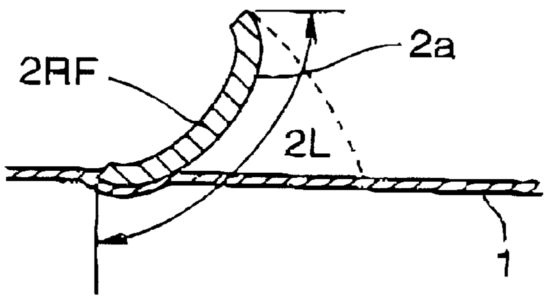
FIG. 16 sequentially illustrates the steps of developing on the surface of the transfer film (shown to be generally exaggerated) a body corresponding to the rear fender panel of the car as the transfer objective body, but shown simplified, in accordance with the first embodiment of the invention.
Figure 16B:
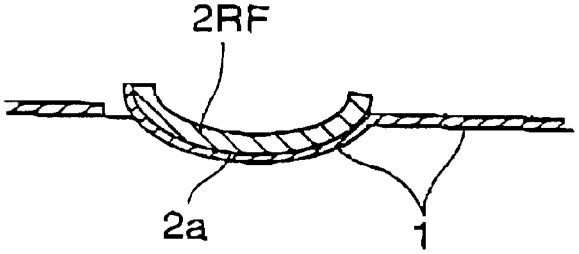

Returning to FIG. 16, the configuration of the panel 2RF as the transfer objective body 2 shown in FIG. 7 is illustrated to be simplified for convenience of explanation. The panel 2RF sequentially enters the liquid in the longitudinal direction while the decoration face 2*a* of the panel sequentially rolls on the surface of the transfer film 1. More particularly, at first, the leading end of the panel 2RF enters the liquid while pressed against the transfer film 1 as shown in FIG. 16(A), the succeeding portion of the decoration face 2*a* sequentially enters the liquid in the longitudinal direction of the panel 2RF while it sequentially rolls on the longitudinal surface of the transfer film 1 as shown in FIG. 16(B) and finally the rear end of the panel 2RF enters the liquid while pressed against the transfer film 1.

Figure 16C:
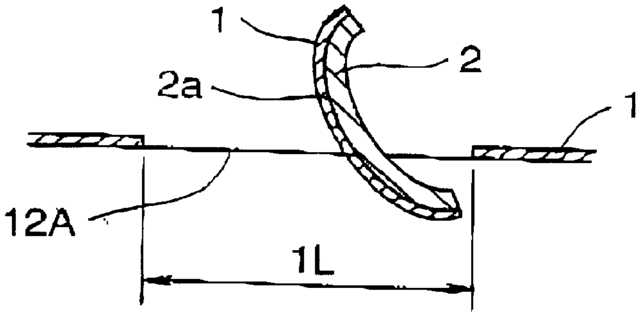
Figure 17:
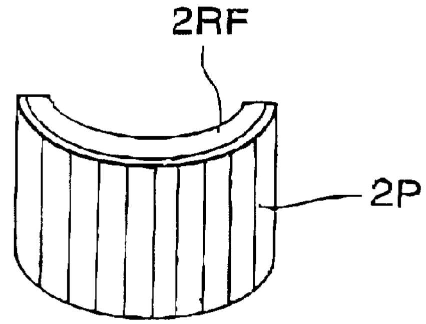
FIG. 17 is a perspective view of the transferred pattern applied on the body in accordance with the embodiment of FIG. 16.

It should be noted that a length 1L over which the print pattern on the transfer film 1 is attached to the surface of the panel 2RF does not corresponds to a projection length of the decoration face 2*a* of the panel 2RF, but corresponds to a length 2L of the developed decoration face 2*a* of the panel 2RF. Thus, the pattern-transferred panel 2RF has the transferred pattern 2P uniform in the longitudinal direction as shown in FIG. 17. In the example of FIG. 16, the print pattern is shown to be a stripe pattern extending in a transverse direction of the transfer film 1 as noted from FIG. 17.

Figure 18A:
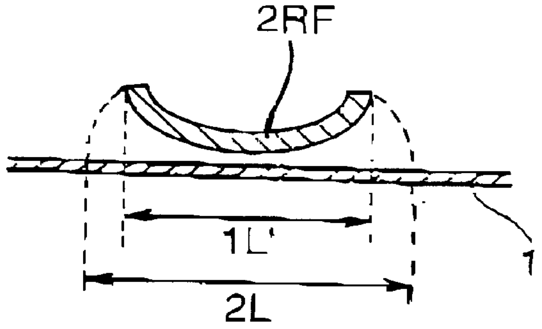
FIG. 18 illustrates an example in which the print pattern is transferred on the same body as shown in FIG. 16 without using the principle of the invention.
Figure 18B:
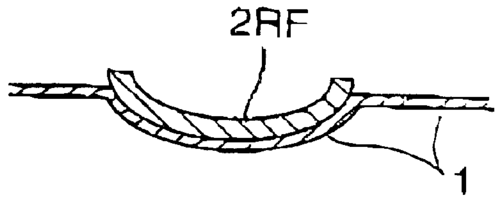
Figure 18C:
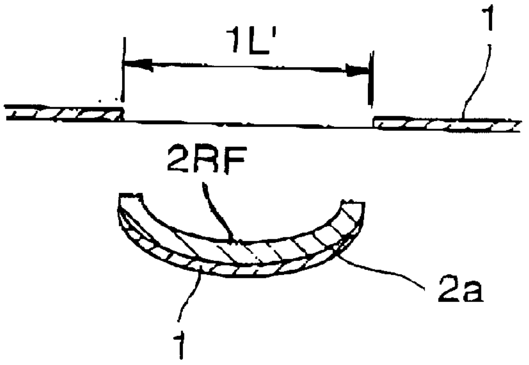
Figure 19:
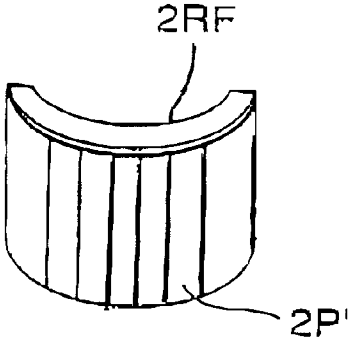
FIG. 19 is a perspective view of the transferred pattern applied on the body in accordance with the example of FIG. 18.

Different from the principle of the invention, if the decoration face 2*a* of the panel 2RF enters the liquid in a vertical direction without rolling in the longitudinal direction as shown in FIGS. 18(A) through 18(C), the length 2L of the panel 2RF as the transfer objective body 2 will be larger than a length 1L' of the transfer film 1 which the print pattern on the transfer film 1 of is attached to the decoration face 2*a* of the panel 2RF having the length 2L (2L>1L') and as a result, the transferred pattern 2P' on the pattern-transferred panel 2RF will be distorted as shown in FIG. 19. This is caused by the print pattern being elongated in the longitudinal direction of the panel 2RF. Although not able to be indicated in the figure, the color of the transferred pattern 2P' will get lighter.

In FIGS. 16 and 18, since the liquid entrance portions of the decoration face 2*a* of the panel 2RF is shown to be shifted sequentially toward the rightward direction, the liquid entrance point seems to be not at the same position and as if it moves toward the upstream side, but it should be noted that since the panel 2RF enters the liquid while it is moving at the same velocity and in the same direction as the transfer film 1 moves, the panel 2RF enters the liquid at the substantially identical liquid entrance point although it rolls on the surface of the transfer film 1 (see FIG. 20).

Next, the method of the invention will be described in details with reference to FIGS. 21 through 25 with respect to an example in which the transfer objective body enters the liquid while it is developed by the transfer objective body oblique lowering system (the transfer objective body transverse moving system).

Figure 21:
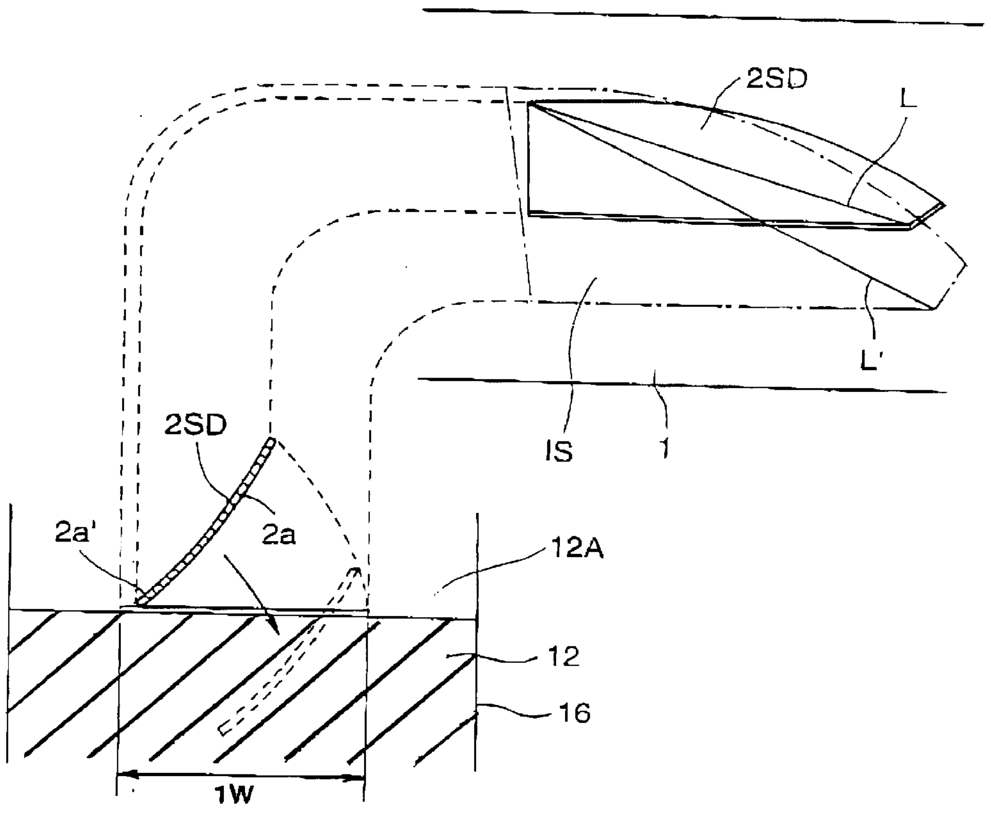
FIG. 21 illustrates an upper half in which the three-dimensional configuration of a side door panel of a car as the transfer objective body and a development face thereof are shown in a plane view and a lower half in which a movement of the transfer objective body is shown in a side elevational view with the transfer objective body being developed while it moves in a transverse direction relative to the transfer film while obliquely standing after the transfer objective body begins to enter the liquid and before it is fully immersed into the liquid.

In the example of FIGS. 21 and 22, the print pattern is transferred onto the side door panel 2SD as the transfer objective body 2 as shown in FIG. 8, what is different from the fender panels 2FF and 2RF is that the panel 2SD has not only the front decoration face portion, but also a back decoration face portion 2*a*' succeeding from the front decoration face 2*a* through the edge of the back face thereof.

As shown in a plane view portion on the upside of FIG. 21, the side door panel 2SD as the transfer objective body 2 enters the liquid in a controlled manner while it transversely moves with such pose as the front decoration face 2*a* of the panel 2SD follows the surface of the transfer film 1 with the decoration faces 2*a* and 2*a*' of the panel 2SD contact the transfer film along the imaginary development face IS which is obtained by imaginarily developing the decoration faces on the surface of the transfer film 1, but not the projection face of the front decoration face 2*a*.

Referring to FIG. 22, one of the edges of the panel 2SD as the transfer objective body 2 contacts the transfer film 1 with such a pose as the panel is obliquely inclined and the panel 2SD enters the liquid obliquely downward while it contacts sequentially following the transfer film 1. More particularly, as shown in FIGS. 22(A) and 22(B), the panel 2SD enters the liquid starting with the one edge thereof while it is pressed against the transfer film 1 without transversely moving at first. At that time, as shown in an enlarged portion of FIG. 22(B), a portion of the transfer film 1 is pulled by the panel 2SD so that the film portion wraps the back decoration face 2*a*' and therefore the print pattern is transferred onto the back decoration face 2*a'*.

Figure 22A:
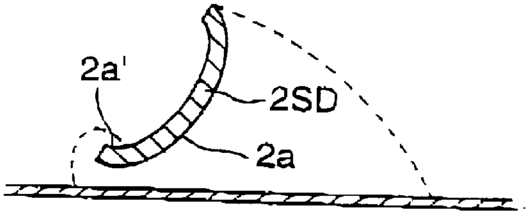
FIG. 22 sequentially illustrates the steps of developing on the surface of the transfer film (shown to be generally exaggerated) a body corresponding to the side door panel of the car as the transfer objective body, but shown simplified while it moves in a transverse direction relative to the transfer film while obliquely standing in accordance with the second embodiment of the invention.
Figure 22B:
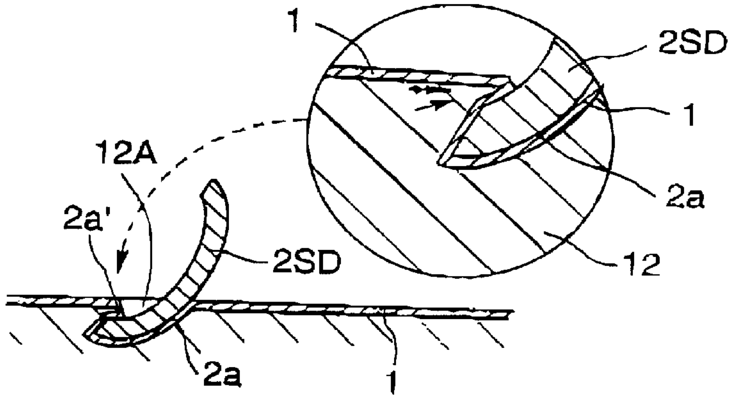
Figure 22C:
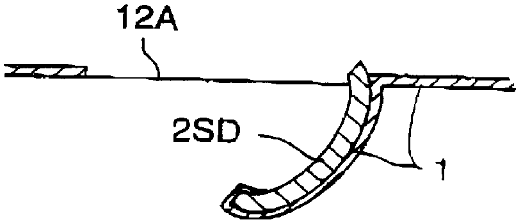
Figure 22D:
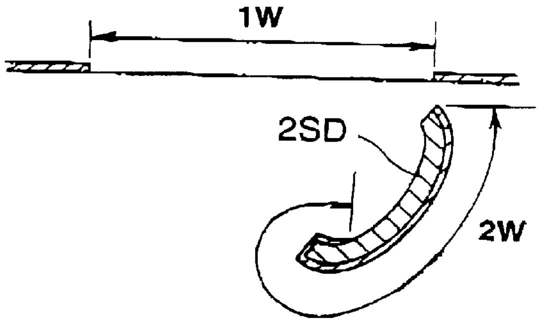

Thereafter, as shown in FIGS. 22(C) and 22(D), the panel 2SD enters the liquid moving obliquely downward while the decoration face 2*a* of the panel 2SD is pressed against the surface of the transfer film 1 in a transverse direction so that it follows the surface of the transfer film 1.

Figure 23:
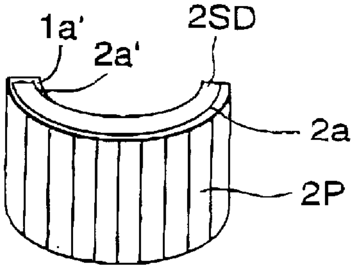
FIG. 23 is a perspective view of the transferred pattern applied on the body in accordance with the embodiment of FIG. 22.

In a manner similar to the transfer objective body rolling system, in the transfer objective oblique lowering system, a width size 1W of the transfer film 1 attached to the surface of the panel 2SD shown in FIG. 22(D) corresponds to a width size 2W of the development face which is obtained by developing the curved decoration faces 2*a* and 2*a*' of the panel 2SD, not to the projection width size of the decoration face 2*a* of the panel 2SD. Thus, the pattern-transferred panel 2SD has the transferred pattern uniform in the transverse direction as shown in FIG. 23.

Figure 24A:
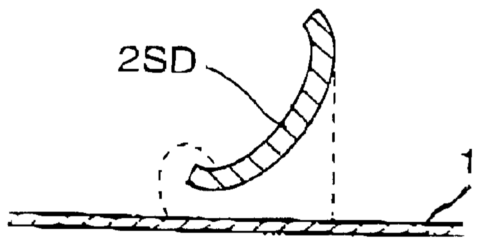
FIG. 24 illustrates an example in which the print pattern is transferred on the same body as shown in FIG. 22 without using the principle of the invention.
Figure 24B:
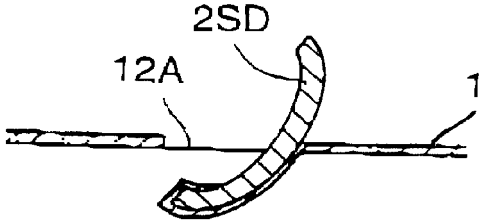
Figure 24C:
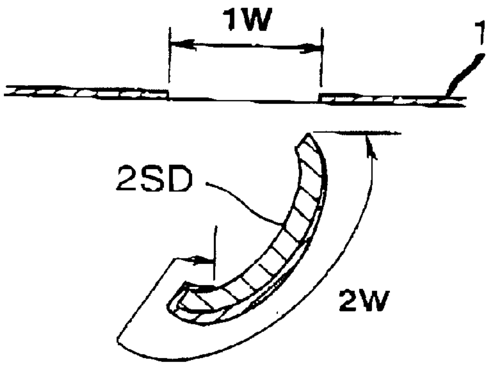
Figure 25:
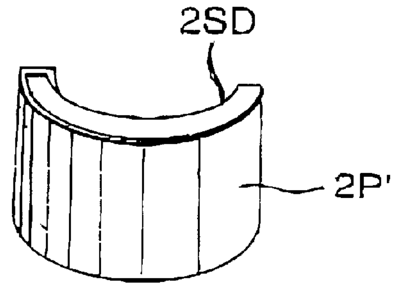
FIG. 25 is a perspective view of the transferred pattern applied on the body in accordance with the example of FIG. 24.

Different from the principle of the invention, if the decoration face 2*a* of the panel 2SD enters the liquid while being lowered along a vertical direction without transversely moving as shown in FIGS. 24(A) through 24(C), the width 2W of the panel 2SD as the transfer objective body 2 will be remarkably larger than a width 1W' of the transfer film 1 over which the print pattern on the transfer film 1 is attached to the decoration face 2*a* of the panel 2SD (2W>>1W') and as a result, the transferred pattern 2P' on the pattern-transferred panel 2SD will not be uniform as shown in FIG. 25. This is caused by the print pattern being elongated in the transverse direction of the panel 2SD. Although not able to be indicated in the figure, the color of the transferred pattern 2P' will get lighter.

Although, in the transfer objective body oblique lowering system of FIG. 22, the transfer objective body 2 moves in the transverse direction of the transfer film 1, it also enters the liquid moving in the longitudinal direction of the transfer film 1 at the velocity corresponding to the feeding velocity of the transfer film 1 while the pose thereof is so controlled that the longitudinal surfaces of the decoration faces 2*a* and 2*a*' contact the surface of the transfer film 1 following the plane surface thereof.

Thus, the transfer objective body 2 enters the liquid in the longitudinal direction at the velocity corresponding to the feeding velocity of the transfer film 1 while the decoration faces 2*a* and 2*a*' are developed on the surface of the transfer film 1 and it also enters the liquid in the transverse direction in accordance with the transfer objective body oblique lowering system (the transfer objective body transverse moving system in the illustrated embodiment) while the decoration faces 2*a* and 2*a*' are developed on the surface of the transfer film 1 on the liquid surface 12A.

In the method of the invention, the condition in which the decoration face 2*a* of the transfer objective body 2 having dents and protrusions is prevented from forming air pockets therein as well as the condition in which the transfer objective body 2 enters the liquid while the decoration face thereof is developed in the plane manner on the surface of the transfer film 1 following the latter will be described herein just below with respect to an example of the rear door panel 2RD with reference to FIGS. 26 and 27.

Figures 26A, 26B, 26C, 26D, 26E:
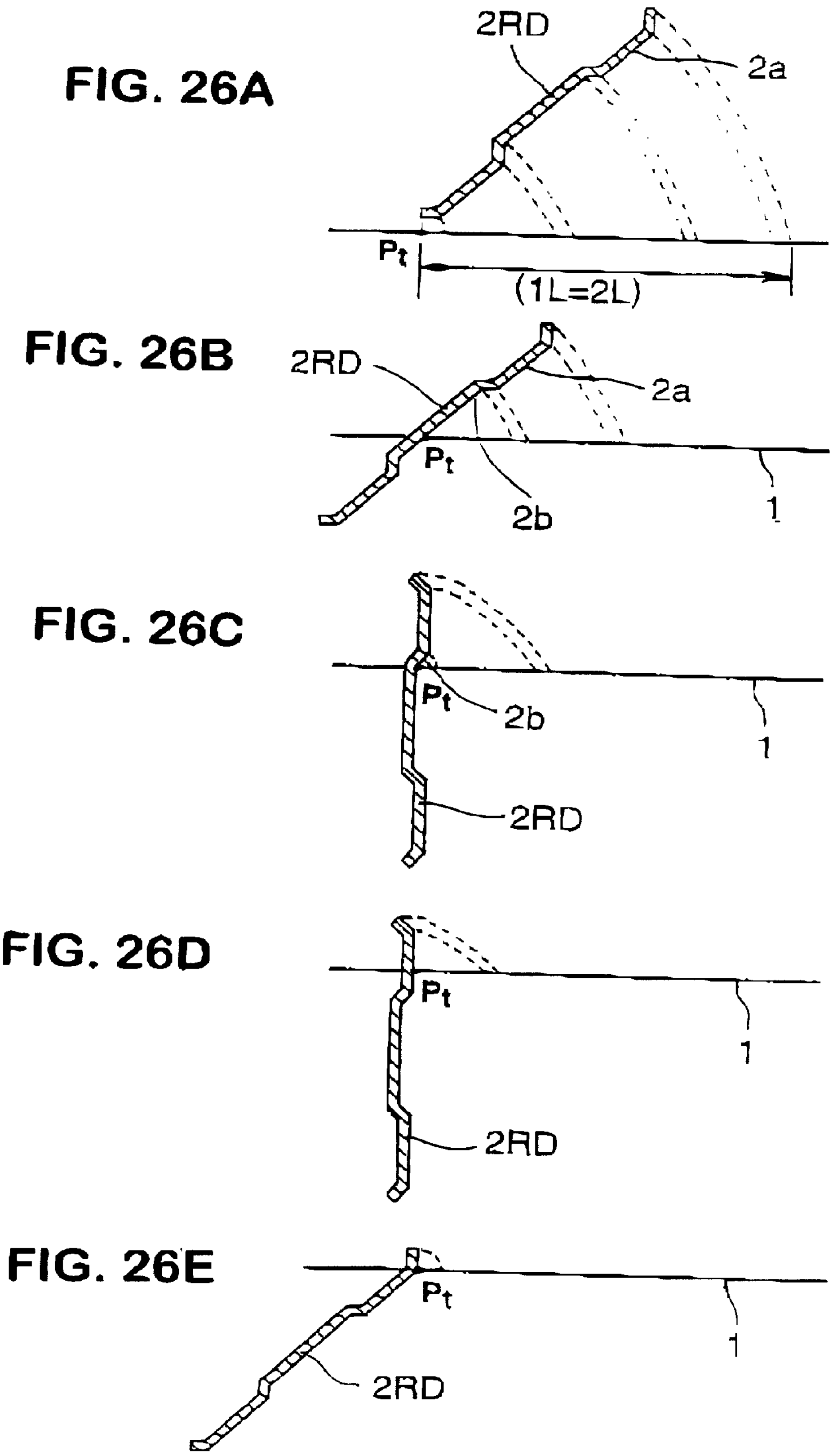
FIG. 26 sequentially illustrates the steps of developing on the surface of the transfer film the rear fender panel of the car as the transfer objective body although used by the method substantially identical to that of FIG. 16, but adding the step of vertically standing the transfer objective body halfway in accordance with the third embodiment of the invention.

Fundamentally, the transfer objective body 2 enters the liquid in accordance with the aforementioned principle of the invention, but as shown in FIG. 26(A), the transfer objective body 2 enters the liquid with such a pose as the decoration face 2*a* of the transfer objective body 2 contacts and follows the surface of the transfer film 1 so that a developed length 2L which is obtained by developing the rear door panel 2RD as the transfer objective body 2 including the dents and the protrusions in the plane manner (in a linear manner) corresponds to a length IL of the transfer film 1.

As shown in FIG. 26(B), the transfer objective body 2 enters the liquid while maintaining the substantially uniform liquid entrance angle at the velocity corresponding to the feeding velocity of the transfer film 1 so that the substantially linear portion of the decoration face 2*a* follows the surface of the transfer film 1.

As shown in FIG. 26(C), when the portion having the dent 2*b* of the decoration face 2*a* reaches the liquid entrance point Pt, the transfer objective body 2 enters the liquid while it rises vertically and is lowered in a vertical direction. Although the liquid entrance pose of only the surface variation portion at the terminal end of the dent 2*b* is shown in FIG. 26(C), the surface variation portion at the leading end of the dent 2*b* will enter the liquid with the same liquid entrance pose.

Figure 27A:
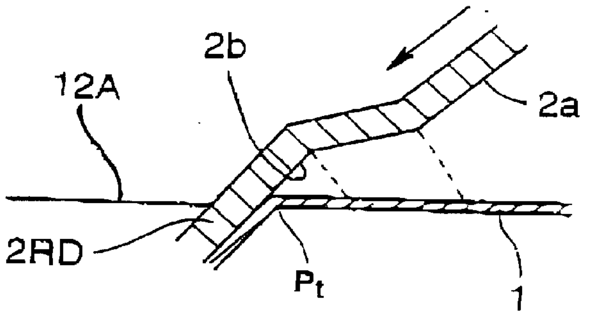
FIG. 27 illustrates in an enlarged view the step of vertically standing the transfer objective view halfway in accordance with the embodiment of FIG. 26.
Figure 27B:
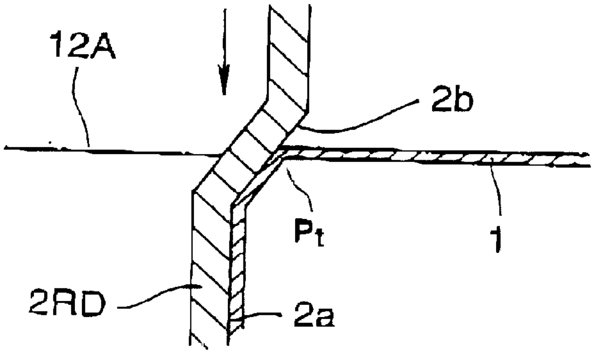

The portion of the transfer objective body 2 between the leading surface variation portion and the terminating surface variation portion of the dent 2*b* enters the liquid moving obliquely downward in the same manner as the other surface portions of the decoration face 2*a* as shown in FIGS. 26(B) and 27(A).

Thereafter, as shown in FIG. 26(D), the remaining portions of the decoration face 2*a* enter the liquid while returning again to the original liquid entrance angle so that they follow the surface of the transfer film 1.

As shown in FIG. 26(C), as the transfer objective body 2 is vertically lowered with the dent 2*b* faced sideways, no air is closed within the dent 2*b* and therefore the transfer objective body 2 can enter the liquid while the air is discharged sideways. More particularly, since no air is involved in the dent 2*b* of the decoration face 2*a* of the transfer objective body 2, no air pocket in which the air remains is formed between the surface of the transfer objective body 2 and the transfer film 1. Thus, the print pattern on the transfer film 1 can be positively adhered even to the surfaces of the dent portions 2*b*.

Figure 27C:
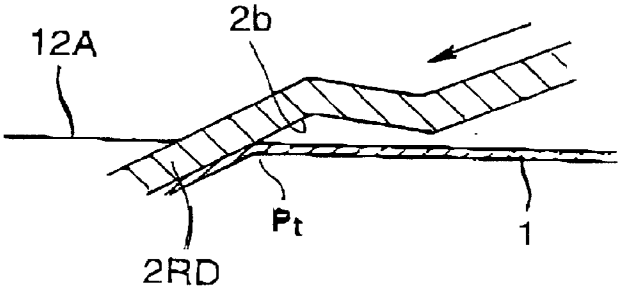

If the transfer objective body 2 enters the liquid so that the portion of dent 2*b* thereof is closed relative to the transfer film 1 as shown in FIG. 27(C), an air pocket will be formed between the transfer face of the transfer objective body 2 and the transfer film 1, which causes the print pattern to be poorly adhered to the transfer objective body.

Means to prevent this air pocket from being formed is that the transfer enters the liquid in the condition that the transfer face of the transfer objective body 2 is open to the transfer film 1 and therefore it should be noted that the aforementioned means is not limited to the vertical liquid entrance of the transfer objective body.

Although, in the example of FIGS. 15 through 27, the transfer objective body 2 enters the liquid surface 12A within the transfer bath 16 using the transfer film feeding system, the principle of the invention may be applied to the case in which the transfer objective body 2 enters the liquid surface 12A within the transfer bath 16 using the transfer film stationary system. In the transfer film stationary system, since the transfer film 1 is considered to be in the condition of being fully activated and swollen all over the face, the liquid entrance position of the transfer objective body 2 is not required to be constant and the liquid entrance velocity of the transfer objective body is not required to be limited.

In either of the transfer film feeding system and the transfer film stationary system, the portion of the decoration face (the transfer face) of the transfer objective body 2 should enter the liquid while they follow the surface of the transfer film in the plane manner, but it should be considered that no air is involved between the transfer objective body 2 and the transfer film 1. To this end, an angle (liquid entrance angle) of the surface portion of the transfer objective body 2 just entering the liquid should be preferably set in the range from 10° through 170°.

If the liquid entrance angle is less than 10°, then the air is easily involved and if the liquid entrance angle is more than 170°, then the transfer film 1 is poorly wrapped around the surface of the transfer objective body 10° so that a discontinuation in the pattern tends to undesirably occur.

The liquid entrance angle of 10° or more than and less than 90° implies that the decoration face portion of the transfer objective body 2 enters the liquid while inclined in the same direction as the transfer film 1 is fed, the liquid entrance angle of more than 90° to 170° implies that the transfer face portion of the transfer objective body 2 enters the liquid while inclined in a direction reverse to that in which the transfer film 1 is fed and the liquid entrance angle of 90° implies that the transfer face portion of the transfer objective body 2 enters the liquid at a right angle relative to the liquid surface 12A.

Figure 20A:
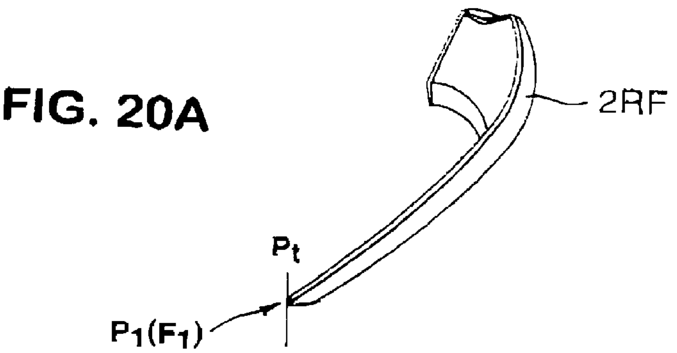
FIG. 20 perspectively illustrates how the liquid entrance states of the whole transfer objective body changes from the first to the last with the portions lying in the air indicated by solid lines and with the portions ling under the liquid indicated by dotted lines.
Figure 20B:
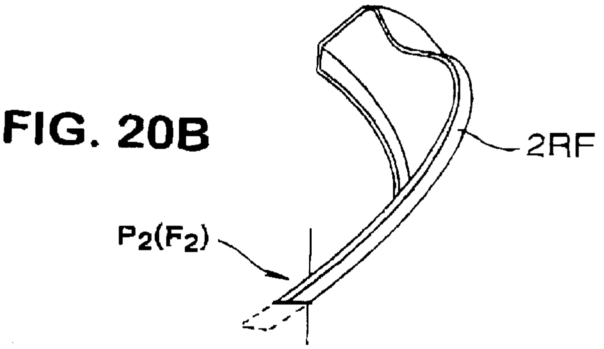
Figure 20C:
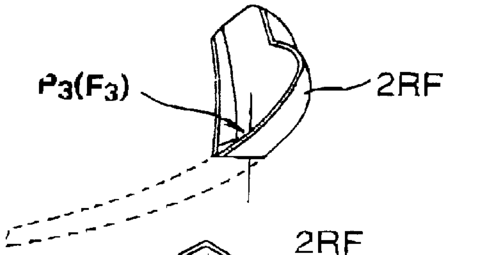
Figure 20D:
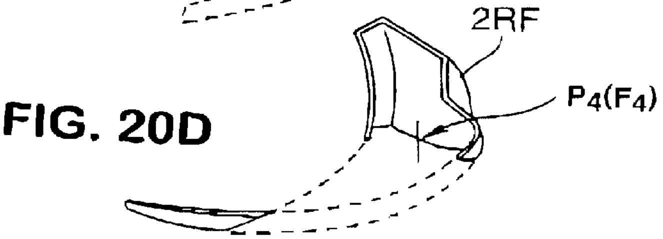
Figure 20E:
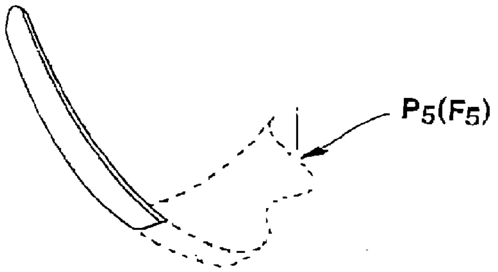

The case that the print pattern is transferred onto the transfer objective body 2 having such a configuration as the transfer face portion thereof is abruptly curved at an angle less than 90 is an example in which the transfer objective body 2 should enter the liquid in the direction reverse to the feeding direction of the transfer film 1. Concretely, this will be used in case that the rear fender panel 2RF of FIG. 7 is the transfer objective body 2. As shown in FIG. 20(D), the last decoration face portion is supposed to enter the liquid at the liquid entrance angle of more than 90 in the direction reverse to the feeding direction of the transfer film 1.

Figure 28A:
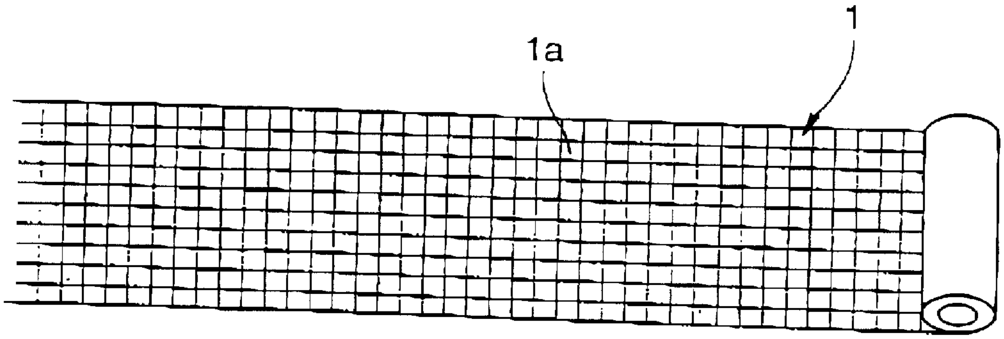
FIG. 28 illustrates a transfer film having a print pattern in the form of lattice as an example and the rear fender, the side door or the front fender of the car having the unified transferred pattern applied by the transfer film.
Figure 28B:
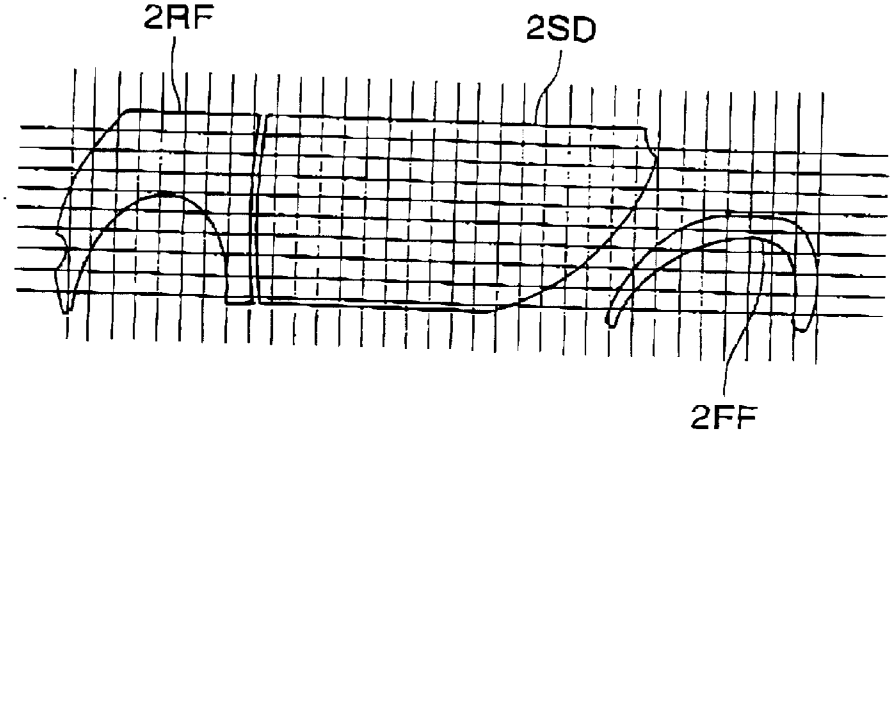

Finally, in some cases such as the transfer objective bodies 2 are panels for various parts, some transfer objective bodies 2 are required to have a combination of patterns so as to have the unified transferred pattern all over the car appearance. For example, supposed that the transfer film 1 has a lattice-like pattern 1*a* as shown in FIG. 28(A), the transfer objective bodies 2 are required to contact the transfer film 1 so that the front fender panel 2FF, the side door panel 2SD and the rear fender panel 2RF have the transferred lattice-like patterns 2P unified as shown in FIG. 28(B). This can be accomplished by making the extension direction of the predetermined transferred pattern coincident with the longitudinal direction of the transfer film 1, but not by making the center line of the liquid entrance of the transfer objective bodies 2 coincident with the center line in the transverse direction. Although, in FIG. 28, the example of the lattice-like patterns is illustrated, it does not imply that the practical car has the lattice-like patterns set. It should be understood that the lattice-like patterns are used because they would facilitate to explain whether the transferred patterns are unified or not. The lattice-like patterns of FIGS. 29 through 31 are used also for the same reason.

Figure 29A:
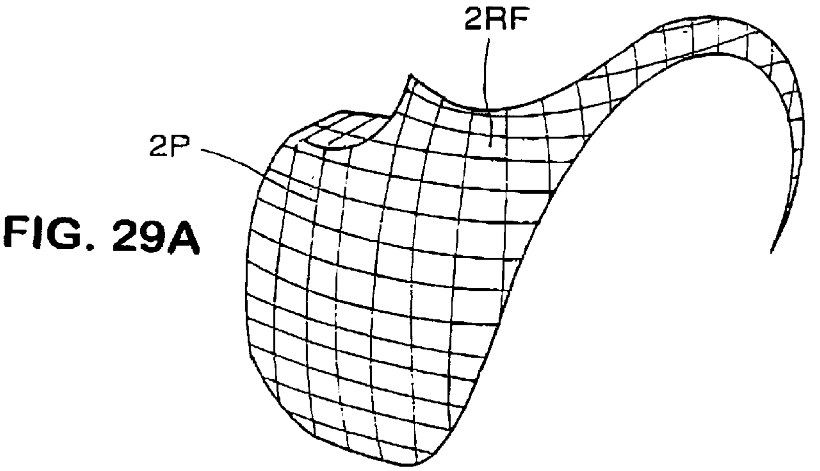
FIG. 29 illustrates in a perspective view a rear fender panel having a desirable transferred pattern and in a plane view a development face for providing the desirable transferred pattern for the rear fender panel.
Figure 29B:
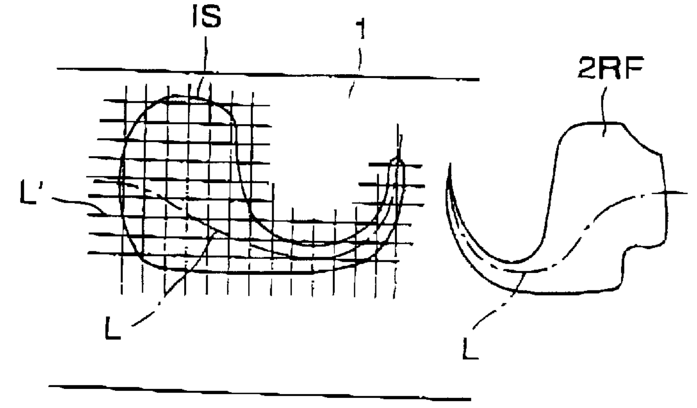

For example, supposed that the transferred patterns 2P as shown in FIGS. 28(A) and 29(A) are formed on the rear fender panel 2RF of the car, the decoration face of the rear fender panel 2RF follows the surface of the transfer film 1 so that the decoration face of the panel 2RF is developed as the imaginary development face IS on the transfer film 1. This is accomplished by making the pattern on the imaginary development face IS coincident with the print pattern on the transfer film 1, but not by making the center line of the liquid entrance of the transfer objective bodies 2 coincident with the center line L' of the surface of the transfer film 1.

Figure 30A:
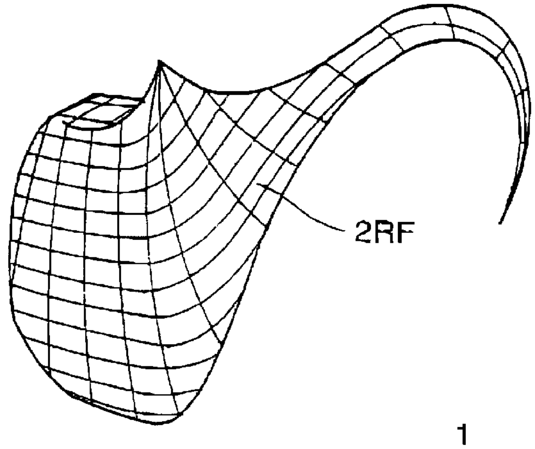
FIG. 30 illustrates in a perspective view a rear fender panel having an undesirable transferred pattern and in a plane view a development face for providing the undesirable transferred pattern for the rear fender panel.
Figure 30B:
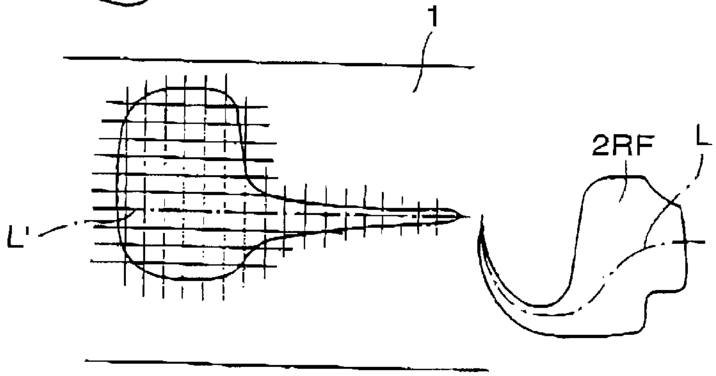
Figure 31A:
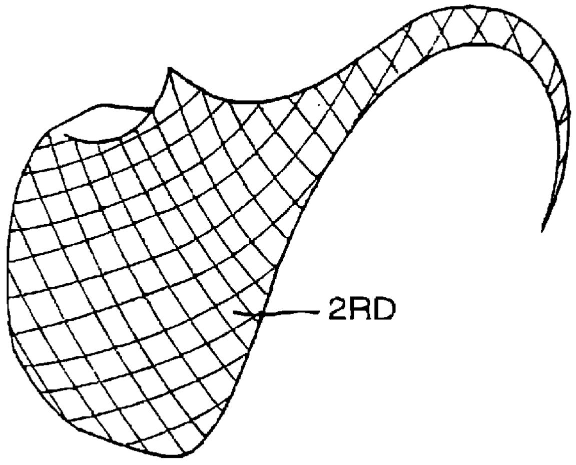
FIG. 31 illustrates in a perspective view a rear fender panel having another undesirable transferred pattern and in a plane view a development face for providing the undesirable transferred pattern for the rear fender panel.
Figure 31B:
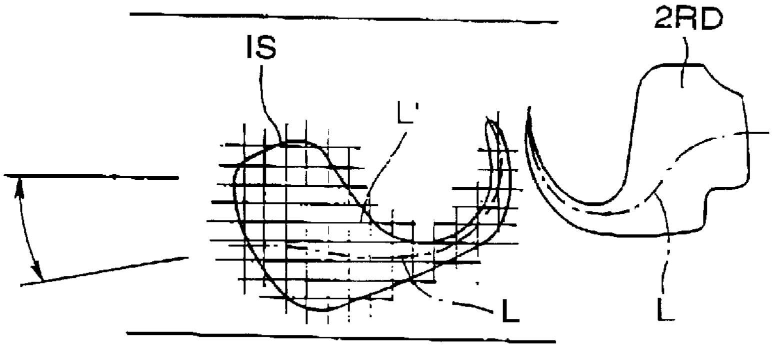

If the center line of the liquid entrance of the rear fender panel 2RF would follow the transfer film 1 along the center line L' of the imaginary development face IS so as to correspond with the center line of the transfer film 1 in the transverse direction as shown in FIG. 30(B), the panel 2RF would have the pattern extending in an inclined manner as shown in FIG. 30(A). This deteriorates the appearance of the rear fender panel 2RF because the obtained pattern is different from the ideal pattern of the panel 2RD of FIG. 28 so that the whole patterns of the car gets unbalanced.

In the embodiments of FIG. 15 and the figures following FIG. 15, the liquid pressure transfer method are described to be made in accordance with the transfer film feeding system using the apparatus of FIGS. 1 through 4. The liquid entrance velocity and the liquid entrance position are important elements for this transfer film feeding system.

Explaining the liquid entrance velocity, if the transfer objective body 2 would enter the liquid at a velocity higher than the traveling or feeding velocity of the transfer film 1, then the print pattern on the transfer film 1 which should be attached to the transfer objective body 2 would be extended so that the pattern is distorted or so that the color is lighter. Reversely, if the transfer objective body 2 would enter the liquid at a velocity lower than the traveling velocity of the transfer film 1, the print pattern on the transfer film 1 which should be attached to the transfer objective body 2 would be shrunk so that the pattern is distorted or so that the color is darker. Thus, in any case, the transfer characteristics will be deteriorated. Therefore, the decoration face 2*a* of the transfer objective body 2 should preferably enter the liquid at the liquid entrance velocity (or the surface velocity) corresponding to the feeding velocity of the transfer film 1.

In some cases, the liquid entrance velocity of the transfer objective body does not always correspond to the traveling velocity of the transfer film 1, but is higher or lower than the traveling velocity of the transfer film 1 in accordance with the other liquid entrance conditions such as the liquid entrance angle and so on or in an arbitrary manner. As the liquid entrance velocity arbitrarily changes, the whole color tone of the decoration face 2*a* of the transfer objective body 2 can change or the pattern thereof can be adjusted.

Next, explaining the liquid contact position, the liquid contact position Pt is set at a position where the transfer film 1 is most suitably swollen by the activator coated by the activator coat bath 32 and the liquid 12 which the transfer film 1 contacts within the transfer bath 16 while it is fed on the liquid surface 12A from the right-hand side to the left-hand side as viewed in FIGS. 1 and 2 after the transfer film 1 contacts the liquid at the liquid contact position Pf as aforementioned.

The reason why the surface of the transfer objective body 2 always contacts the liquid at the substantially identical position Pt is that the transfer objective body 2 is close to the transfer film 1 in the condition that the transfer film 1 is swollen on the same conditions so as to always provide the uniform transfer characteristics.

As shown in FIGS. 10 and 11, the transfer objective body 2 is supported on the transfer objective body holder 50 by being mounted on the leg-like support members 50B of the transfer objective body holder 50. Although, in FIGS. 10 and 11, the transfer objective body 2 is shown to be the front fender panel 2FF of FIG. 6, the other panels 2RF, 2SD and 2RD are also supported on the transfer objective body holder 50 in a similar manner. The main frame 50A of the holder 50 may be grasped by the finger-like grasper 68 of the carrying-in transfer objective body conveyance unit 42 or 42' or the carrying-out transfer objective body conveyance unit 44. As shown in FIGS. 3 and 11, the finger-like grasper 68 of the carrying-in transfer objective body conveyance unit 42 or 42' grasps the frame portion (indicated by a reference numeral 50*a* in FIG. 10) of the main frame 50A of the holder 50 opposite to the frame portion holding the transfer objective body 2 while the finger-like grasper 68 of the carrying-out transfer objective body conveyance unit 44 grasps the side frame portion (indicated by a reference numeral 50*a*' in FIG. 10) of the main frame 50A of the holder 50 on the side of holding the transfer objective body 2. This is why the finger-like graspers 68 of the carrying-in transfer objective body conveyance unit 42 or 42' and the carrying-out transfer objective body conveyance unit 44 should not interfere with each other when the transfer objective body 2 is delivered from the carrying-in transfer objective body conveyance unit 42 or 42' to the carrying-out transfer objective body conveyance unit 44.

The carrying-in transfer objective body conveyance unit 42 or 42' conveys the transfer objective body 2 at a higher velocity to the delivery area where the transfer objective body 2 is delivered to the carrying-out transfer objective body conveyance unit 44 after the transferred pattern is formed on the decoration face 2*a* of the transfer objective body 2 by its liquid entrance. In the delivery area, the pattern-transferred objective body 2B is delivered from the carrying-in transfer objective body conveyance unit 42 or 42' to the carrying-out transfer objective body conveyance unit 44.

Thereafter, the carrying-out transfer objective body conveyance unit 44 conveys the transfer objective body holder 50 holding the pattern-transferred objective body 2B while raising up the holder with such an appropriate liquid take-off pose as the transfer objective body 2B leaves the liquid and delivers the transfer objective body holder 50 to the suspending member 38 which is located at the carrying-out position on the conveyance passage 40 by hooking the holder 50 onto the suspending member 38.

The liquid entrance pose (including the rolling, the oblique downward movement, the liquid entrance angle, the position of the liquid contact center line, the vertical lowering and so on) set for every section of the particular transfer objective body 2A and the liquid take-off pose for the pattern-transferred objective body 2B are stored in the record medium 70 as the pose of the transfer objective body 2 (position informations) together with the liquid entrance velocity and the liquid take-off velocity thereof. These stored data are input to the transfer objective body conveyance control means 76.

The transfer objective body conveyance control means 76 controls driving the carrying-in transfer objective body conveyance unit 42 or 42' grasping the transfer objective body 2A so that it enters the liquid surface 12A within the transfer bath 16 with the predetermined liquid entrance pose and at the predetermined liquid entrance velocity for every section in accordance with the carrying-in record data.

Accordingly, the transfer objective body 2A enters the liquid 12 within the transfer bath 16 with the previously stored liquid entrance pose and at the previously stored liquid entrance velocity for every section thereof.

The transfer objective body conveyance control means 76 controls the carrying-out transfer objective body conveyance unit 44 so that the pattern-transferred objective body 2B leaves the liquid with the predetermined liquid take-off pose and at the predetermined liquid take-off velocity in accordance with the carrying-out record data from the record medium 70.

The transfer objective body conveyance control means 76 controls the carrying-in transfer objective body conveyance unit 42 or 42' so that the liquid entrance pose and the liquid entrance velocity vary smoothly before and after the liquid entrance is switched from one section of the transfer objective body 2 to the adjacent section thereof by taking a smooth command on the carrying-in transfer objective body conveyance unit 42 or 42' of the transfer objective body conveyance means 20.

This smooth command prevents the transfer objective body 2 from being conveyed in a stepped manner due to abrupt variation in the liquid entrance pose and the liquid entrance velocity for every section whenever the sections of the transfer objective body 2 are switched.

The smoothing program will be obtained by a program prepared by a maker for the multi-joint type manipulator (robot) as the transfer objective body conveyance unit.

An operation of transferring the print pattern from the transfer film 1 onto the transfer objective body 2 and carrying out it by the apparatus of the invention will be schematically described with reference to FIGS. 1 through 5.

The transfer objective body 2 is held on the transfer objective body holder 50 as shown in FIGS. 10 and 11, which is suspended by the suspending member 38 on the conveyance passage 40 shown in FIG. 1. The transfer objective body 2 is conveyed from the ultraviolet ray application treatment apparatus 78 to the transfer area of the transfer bath 16 together with the movement of the suspending member 38.

The ultraviolet ray application treatment apparatus 78 serves to treat the surface of the transfer objective body 2 for a purpose of improving a close adhesion of the print pattern in case that the transfer objective body 2 is formed of materials such as polycarbonate, polycarbonate/polybutylene-terephthalate (PC/PBT) and so on to which the print pattern is hard to be closely adhered. Such treatment is not required in case that the surface of the transfer objective body is formed of materials to which the print pattern can be closely adhered.

With the particular transfer objective body 2 being the fender panel of the small-sized car, the door panel thereof and the like, since, in many cases, these panels are formed of plastic materials such as polycarbonate or polycarbonate/polybutylene-terephthalate (PC/PBT), the ultraviolet ray application treatment is preferably made before the transfer operation.

As the untransferred objective body 2A treated by the ultraviolet ray application reaches the inlet of the transfer bath 16 of FIG. 1, either of the carrying-in transfer objective body conveyance units 42 and 42' receives the transfer objective body 2A and starts the operation of conveying it to the transfer bath 16 for a purpose of practicing the transfer operation.

For example, supposed that the right-hand transfer objective body conveyance unit 42 as viewed from the upstream side of the transfer bath 16 starts the operation, the arm group of the transfer objective body conveyance unit 42 (the multi-joint type manipulator 52) is extended to the suspending member 38 located on the conveyance passage 40 immediately above the transfer bath 16 by the horizontal turning mechanism 54 and the vertical turning mechanism 56 to grasp the frame portion 50*a* of the main frame 50A of the transfer objective body holder 50 by the finger-like grasper 68 (see FIG. 11) and to be operated so as to remove the transfer objective body holder 50 out of the hook-like hooking portion 48*a* of the suspending frame 48.

Thereafter, the multi-joint type manipulator 52 of the transfer objective body conveyance unit 42 is so operated that the decoration face 2*a* of the transfer objective body 2A gradually enters the liquid 12 through the liquid entrance position Pt as indicated by an arrow A of FIG. 2. The condition of the liquid entrance of the transfer objective body 2A is as already described with reference to FIG. 15 and the succeeding figures.

As the transfer objective body 2A enters the liquid while it is pressed against the transfer film 1, the print pattern on the transfer film 1 is transferred onto the surface of the transfer objective body 2A under the liquid pressure. While the transfer objective body 2 is immersed into the liquid, the main frame 50A of the transfer objective body holder 50 only at the portion holding the transfer objective body 2 is immersed into the liquid and the frame portion 50*a* or 50*a*' grasping the finger grasper 68 of the multi-joint type manipulator 52 of the transfer objective body conveyance unit 42 is never immersed into the liquid.

As the transfer objective body 2A is sequentially immersed into the liquid and the print pattern on the transfer film 1 is transferred onto the transfer objective body 2A, the carrying-out transfer objective body conveyance unit 44 starts the operation of receiving the transfer objective body 2B. Since the finger-like grasper 68 of the carrying-out transfer objective body conveyance unit 44 (the multi-joint type manipulator 52) grasps the frame portion 50*a*' of the main frame 50 from sideways, it never interferes with the carrying-in transfer objective body conveyance unit 42.

As the carrying-out transfer objective body conveyance unit 44 grasps the transfer objective body holder 50 holding the transfer objective body 2B in this manner, the finger-like grasper 68 of the carrying-in transfer objective body conveyance unit 42 releases the transfer objective body holder 50 and thus the transfer objective body 2B is completely delivered to the carrying-out transfer objective body conveyance unit 44.

The carrying-out transfer objective body conveyance unit 44 receiving the pattern-transferred objective body 2B conveys the transfer objective body 2B so that it sequentially leaves the liquid in the same direction as the untransferred objective body 2A enters the liquid.

Since the carrying-in transfer objective body conveyance unit 42 delivering the transfer objective body 2 to the carrying-out transfer objective body conveyance unit 44 and being set free has nothing to do with the transfer operation, it can return at higher velocity to the original position of FIG. 1 where it is preparatory for the next transfer operation. While the pattern-transferred objective body 2 still lies in the liquid even though the transfer operation of the transfer objective body 2 by the former carrying-in transfer objective body conveyance unit 42 is finished, another carrying-in transfer objective body conveyance unit 42' similarly receives the next transfer objective body 2A and starts the operation of conveyance for practicing the transfer operation therefor.

The carrying-out transfer objective body conveyance unit 44 receiving the pattern-transferred objective body 2B returns the transfer objective body holder 50 holding the transfer objective body 2B to the suspending frame 48 suspended by the suspending member 38 advancing to the outlet of the transfer bath 16 of FIG. 1.

The pattern-transferred objective body 2B thus returned to the conveyance passage 40 is conveyed to the washing step, the drying step and the finishing step not shown whereby the transfer objective body 2 (various panels of the car) having the transferred pattern is produced.

Although the condition in which the transfer objective body 2A enters the liquid 12 within the transfer bath 16 by the carrying-in transfer objective body conveyance unit 42 or 42' is described in details with reference to FIG. 15 and the succeeding figures, the position where the surface of the transfer objective body 2A enters the liquid is so set at the liquid entrance position Pt where the transfer film 1 gets swollen most suitably for the transfer operation. The transfer objective body conveyance control means 76 controls to drive the multi-joint type manipulator 52 of the carrying-in transfer objective body conveyance unit 42 or 42' so that the first liquid entrance point (not necessarily on the center line of the liquid entrance) of the transfer objective body 2A grasped by the finger grasper 68 reaches the liquid entrance position Pt.

As already described, the transfer objective body 2 enters the liquid with such a pose as the three-dimensional decoration face thereof sequentially follows the transfer film 1 as if developed on the transfer film 1 in the plane manner. In this case, the carrying-in transfer objective body conveyance unit 42 or 42' conveys the transfer objective body 2A while the liquid entrance pose for every section of the transfer objective body 2A is controlled in accordance with the instructions from the transfer objective body conveyance control means 76.

Also, as already described, since the transfer objective body conveyance control means 76 has the command for operating so that the portion between the adjacent sections enters the liquid in a smooth manner, the liquid entrance pose of the transfer objective body 2A as an example of the liquid entrance conditions is practically so controlled that it never abruptly changes whenever the sections are switched, but gradually changes.

In this manner, since the decoration face 2*a* of the transfer objective body 2A has the print pattern transferred while it contacts the transfer film 1 over the area corresponding to the area of the development face of the decoration face 2*a*, the print pattern on the transfer film 1 can be transferred in good conditions onto the decoration face 2*a* of the transfer objective body 2A having a large-sized and complicated three-dimensional surface configuration.

Although, in the aforementioned embodiments, the print pattern is transferred onto the fender panel and the door panel of the car by the liquid pressure transfer, this invention can be also applied to other panels of the car, large-sized panels used in various field other than the car or any suitable articles.

In this manner, since the transfer objective body enters the liquid while the transfer face (the decoration face or the design face) of the transfer objective body on which the print pattern should be transferred follows the transfer film as if the transfer face is developed on the surface of the transfer film in the plane manner, the decoration face of the transfer objective body is adhered to the surface of the transfer film with the same area as the development face of the decoration face 2*a*. Thus, in case that the transfer objective body is a large-sized one such as the car panel of the fender or the like, for example, which has a large radius of curvature, a large area of the curved portion and large areas of adjacent portions on both sides of the curved portion even though it has a small value of angle variation of the curved portion, the print pattern on the transfer film is transferred onto the decoration face 2*a* of the transfer objective body following the variation in the surface configuration of the transfer objective body. Therefore, the surface portion of the transfer objective body and the print pattern on the transfer film 1 which should be closely adhered to the surface portion of the transfer objective body are closely adhered to each other as if they stick to each other in the plane manner with the same area. This prevents the print pattern which should be transferred onto the transfer objective body from being extended and lighter in its color or prevented from being shrunk and darker in its color. This allows the print pattern to be satisfactorily attached all over the surface portions of the transfer objective body and therefore the pattern transferred onto the transfer objective body 2 is maintained uniformly and an intended expression of design can be obtained on the transfer objective body 2.

The transfer objective body can follow the transfer film so as to be easily developed thereon by rolling the transfer face of the transfer objective body on the surface of the transfer film when the transfer objective body enters the liquid or lowering the transfer objective body obliquely downward relative to the surface of the transfer film so as to draw the transfer film onto the transfer objective body when the transfer objective body enters the liquid.

Although the transfer objective body enters the liquid with the liquid entrance angle suitable for following the surface of the transfer film so as to be developed thereon in the plane manner, in case that an air pocket tends to be formed between the transfer objective body and the transfer film on the liquid entrance of the transfer objective body such as the decoration face of the transfer objective body has the dent, the transfer objective body can enter the liquid with such a liquid entrance angle as the transfer face is opened whereby such an air pocket can be effectively prevented.

In the liquid pressure transfer method according to the transfer film feeding system, as the transfer face of the transfer objective body is so controlled to enter the liquid at the substantially identical position (the liquid entrance position) in the direction in which the liquid flows, the transfer objective body is immersed into the liquid at the position where the ink forming the print pattern on the transfer film always has a uniform degree of re-tackiness and a uniform degree of being swollen. This serves to improve the transfer characteristics together with setting the liquid entrance velocity.

As the liquid entrance conditions such as the liquid entrance pose (including the liquid entrance angle), the liquid entrance velocity or the like are set for each of a plurality of sections into which the decoration face of the transfer objective body is divided in general consideration of variation in the curvature in the conveyance direction of the transfer objective body and variation in the curve of the cross section configuration, the liquid entrance conditions of the transfer objective body having a complicated three-dimensional surface configuration can be more easily set.

As the liquid entrance conditions such as the liquid entrance pose, the liquid entrance velocity and so on for every section of the decoration face of the transfer objective body are previously stored and the liquid entrance conditions of the transfer objective body are controlled in accordance with the stored data, the liquid pressure transfer operation can be promptly made for various transfer objective bodies by changing record medium in which the liquid entrance conditions of the transfer objective body for every kind thereof are previously stored or switching areas in which they are stored.

As the transfer objective body conveyance means comprises the plurality of carrying-in transfer objective body conveyance units disposed in a manner spaced to each other in the position adjacent to the transfer objective body liquid contact position of the transfer bath and at least one carrying-out transfer objective body conveyance unit disposed in the position adjacent to the transfer objective body take-off position of the transfer bath, the plurality of the carrying-in the transfer objective body conveyance units can be alternately used for sequentially carrying in each one of the transfer objective bodies to enter the liquid at the liquid contact point so as to practice the transfer operation thereof and deliver the transfer objective body to the carrying-out transfer objective body conveyance unit at the transfer objective body liquid take-off area.

Thus, one of the carrying-in transfer objective body conveyance units which previously carries in the transfer objective body can be rapidly returned to the carrying-in start position while another carrying-in transfer objective body conveyance unit is carrying in the next transfer objective body to practice the transfer operation therefor within the transfer bath and therefore, the number of the transfer objective bodies onto which the print pattern should be transferred per unit time can increase whereby the transfer operation can be more effectively made.

In particular, with the plurality of carrying-in transfer objective body conveyance units used, while one of the carrying-in transfer objective body conveyance units is carrying in the transfer objective body, the other carrying-in transfer objective body conveyance unit can be returned at a higher velocity to the carrying-in start position. Therefore, the next transfer objective body can be carried in to the transfer position succeeding the transfer operation of the former transfer objective body now progressing. Thus, it will be noted that the print pattern can be more effectively transferred onto more transfer objective bodies with a relatively shorter space by these carrying-in transfer objective body conveyance units.

Since the liquid pressure transfer article of the invention is produced by transferring the print pattern onto the decoration face of the transfer objective body while the decoration face follows the transfer film as if the decoration face is developed on the surface of the transfer film in the plane manner, it can have a good appearance without deforming the transferred pattern and changing the thickness of the color thereof even though it has a large sized and complicated configuration.

UTILIZABILITY OF INDUSTRIES

As aforementioned, the method of the invention suitable for transferring the print pattern on the surface of the transfer objective body such as a car panel including a fender, a door or the like having a transfer face of large area and of a complicated surface configuration.

What is claimed is:

1. A liquid pressure transfer method for transferring a print pattern on a transfer film floating along a surface of a liquid within a transfer bath onto a three dimensional transfer face of a transfer objective body comprising the steps of determining a two dimensional imaginary development face corresponding with said three dimensional transfer face wherein local linear transverse dimensions of the two dimensional imaginary face approximate surface lengths of the three dimensional transfer face at corresponding locations, immersing said transfer objective body into said liquid to follow said film so as to contact said print pattern with said three dimensional transfer face, controlling the posture of said body as it is immersed in said liquid to cause said three dimensional transfer face to contact an area of said print pattern on said film corresponding with said two dimensional imaginary development face and transferring said area of said print pattern under liquid pressure to said three dimensional transfer face.

2. A liquid pressure transfer method as set forth in claim 1, wherein the step of controlling the posture of said body includes rolling said three-dimensional transfer face on said print pattern to contact said two-dimensional imaginary face.

3. A liquid pressure transfer method as set forth in claim 1, wherein the step of controlling the posture of said body includes moving said three-dimensional transfer face obliquely downward into said liquid to contact said print pattern along said two-dimensional imaginary face.

4. A liquid pressure transfer method as set forth in claim 1, 2, or 3, wherein said transfer objective body enters said liquid at an angle of from about 10° to about 170°.

5. A liquid pressure transfer method as set forth in claim 1, 2 or 3, wherein said transfer film is supplied by being fed at a predetermined velocity within said transfer bath and said transfer objective body enters said liquid at a velocity corresponding to said feeding velocity of said transfer film.

6. A liquid pressure transfer method as set forth in claim 1, 2 or 3, wherein said transfer film is supplied by being fed at a predetermined velocity within said transfer bath and said transfer objective body enters said liquid at a generally constant liquid contact position within said transfer bath.

7. A liquid pressure transfer method as set forth in claim 1, 2, 3 or 3, wherein said transfer objective body is divided into a plurality of sections corresponding with variations in a surface configuration of said transfer face and a liquid entrance posture of said transfer face of said transfer objective body is set for each section.

8. A liquid pressure transfer method as set forth in claim 7, wherein one of said sections of said transfer objective body is formed for at least one three-dimensional configuration such as a dent, a protrusion or a change of radius of curvature of said three dimensional transfer face of said transfer objective body.

9. A liquid pressure transfer method as set forth in claim 1, 2, or 3, wherein the step of controlling the posture of said body as it is immersed in said liquid includes changing said posture in accordance with previously determined and stored liquid entrance conditions.

10. A liquid pressure transfer method as set forth in claim 1, 2 or 3, wherein said three dimensional transfer face to which said print pattern is transferred and adhered is sufficiently large to cause said transferred and adhered print pattern to be extended or shrunk if said transfer is immersed into said liquid with a fixed posture.

11. A liquid pressure transfer apparatus for transferring a print pattern carried on a transfer film onto a three dimensional transfer face of a transfer objective body, said apparatus comprising a transfer bath containing a liquid along which said transfer film floats for contact with said transfer objective body, a transfer objective body conveyance means to convey said transfer objective body so that said three dimensional transfer face is immersed into said liquid within said transfer bath to contact and transfer said print pattern onto said three dimensional transfer face using liquid pressure and thereafter to withdraw said three dimensional transfer face from said liquid in said transfer bath, and a transfer objective body conveyance control means to control the posture of said three dimensional transfer face as it enters the liquid to cause said three dimensional transfer face to follow said transfer film so as to contact an area of said print pattern comprising a two dimensional imaginary development face corresponding with said three dimensional transfer face wherein local linear transverse dimensions of the two dimensional imaginary face approximate surface lengths of the three dimensional transfer face at corresponding locations.

12. A liquid pressure transfer apparatus as set forth in claim 11, wherein said transfer objective body conveyance control means is constructed and arranged to control the posture of said three dimensional transfer face as it enters the liquid in accordance with the method of claim 2 or 3.

13. A liquid pressure transfer apparatus as set forth in claim 12, wherein said transfer objective body conveyance means comprises a plurality of carrying-n transfer objective body conveyance units disposed at a position adjacent to a liquid entrance point of said transfer objective body of said transfer bath and at least one carrying-out transfer objective body conveyance unit disposed at a transfer objective body take-off area of said transfer bath.

14. A liquid pressure transfer apparatus as set forth in claim 11 or 13, wherein said transfer objective body is a car panel.

15. A liquid pressure transfer article formed by transferring a print pattern on a transfer film onto a transfer objective body by the method set forth in claim 1, 2 or 3.

* * * * *